United States Patent [19]

Buchwitz et al.

[11] Patent Number: 5,495,416

[45] Date of Patent: Feb. 27, 1996

[54] AUDIO INFORMATION APPARATUS FOR PROVIDING POSITION INFORMATION

[75] Inventors: Guy R. Buchwitz, Oxnard; David H. Muskat, Camarillo, both of Calif.

[73] Assignee: The United States of America as represented by the Secretary of the Navy, Washington, D.C.

[21] Appl. No.: 335,560

[22] Filed: Nov. 7, 1994

[51] Int. Cl.⁶ .................................................. G01C 21/00
[52] U.S. Cl. .......................................... 364/449; 364/443
[58] Field of Search ..................................... 342/386, 357; 364/450, 443, 361, 449; 340/996; 379/59; 395/2.1

[56] References Cited

U.S. PATENT DOCUMENTS

| | | | |
|---|---|---|---|
| 4,190,819 | 2/1980 | Burgyan | 340/23 |
| 4,490,717 | 12/1984 | Saito | 340/996 |
| 5,119,301 | 6/1992 | Shimizu et al. | 364/450 |
| 5,146,538 | 9/1992 | Sobti et al. | 395/2.1 |
| 5,153,836 | 10/1992 | Fraughton et al. | 364/361 |
| 5,343,399 | 8/1994 | Yokoyama et al. | 364/449 |
| 5,367,306 | 11/1994 | Hollen et al. | 342/386 |
| 5,381,338 | 1/1995 | Wysocki et al. | 364/449 |
| 5,388,147 | 2/1995 | Grimes | 379/59 |
| 5,389,934 | 2/1995 | Kass | 342/357 |
| 5,406,492 | 4/1995 | Suzuki | 364/449 |
| 5,410,486 | 4/1995 | Kishi et al. | 364/449 |

*Primary Examiner*—Kevin J. Teska
*Assistant Examiner*—Dan Fiul
*Attorney, Agent, or Firm*—David S. Kalmbaugh; Melvin J. Sliwka

[57] ABSTRACT

An audio information apparatus for providing position information as to the location of a target comprising a global positioning system receiver affixed to the target for generating a string of fifty ASCII characters representing the latitude and longitude spherical coordinates of the target. The fifty ASCII characters are supplied to a microprocessor which converts a predetermined number of the fifty characters to a plurality of a four bit addresses. The four bit addresses are supplied to a digital voice module which generates an analog audio voice signal in response to the four bit addresses. The analog audio voice signal which represents the location of the global positioning system receiver is supplied to a speaker. The speaker then broadcast the exact location of the global positioning system receiver. The analog audio voice signal is also supplied to a transmitter for transmission of the signal to a ground station.

8 Claims, 8 Drawing Sheets

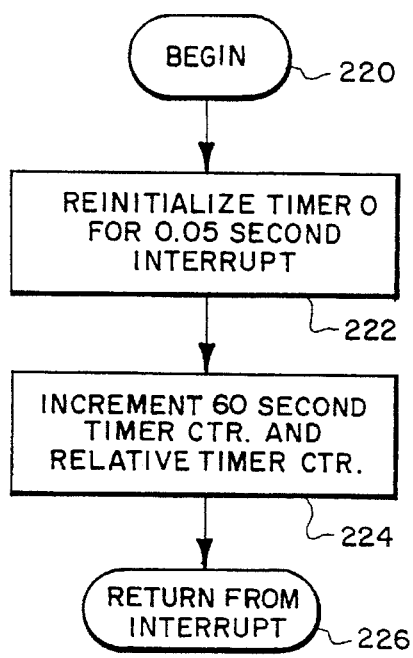
Fig. 4.
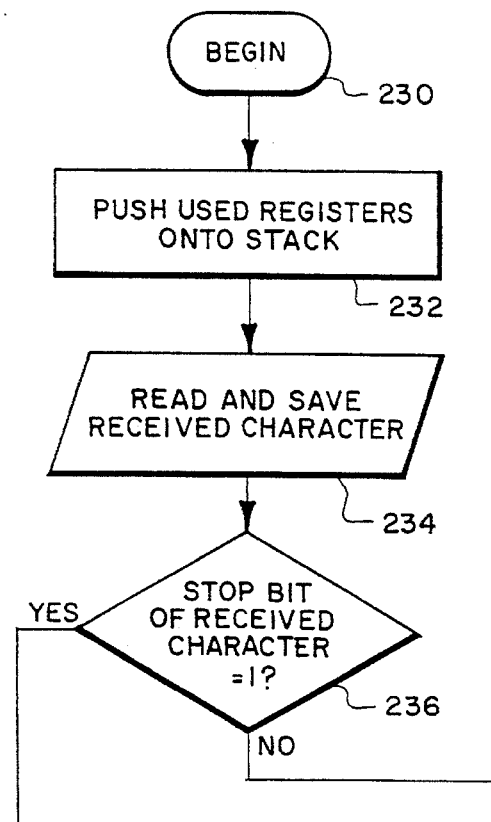
Fig. 5a.
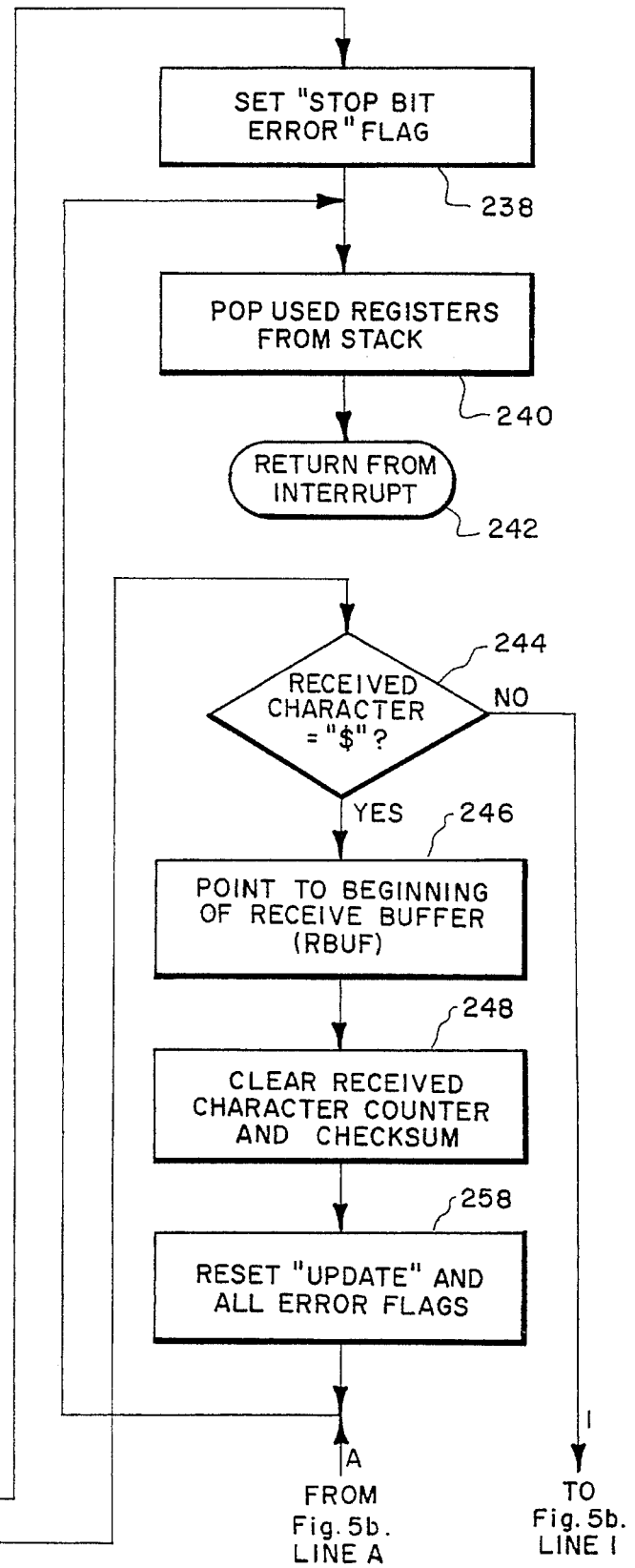

5,495,416

AUDIO INFORMATION APPARATUS FOR PROVIDING POSITION INFORMATION

BACKGROUND OF THE INVENTION

1. Field of the Invention

The present invention relates generally to audio information systems and is more particularly concerned with the use of a microprocessor which receives positional information from a global positioning system receiver and then converts the positional information to a digital format for a voice module which broadcast the information.

2. Description of the Prior Art

In the past a variety of systems have been developed to provide audio information to indicate to the user their position or the position of an object that is being tracked by the user. Most such prior art systems which use audio signals or sound as a means for providing position information are relatively simple in design yet these systems are extremely limited as to their end use.

For example, U.S. Pat. No. 4,490,717 discloses a graphic display device which includes a cassette tape recorder which is provided as a memory to store graphic data of the drive route. The cassette tape recorder includes a track which is used for voice. The content recorder on the voice track is converted to an electrical signal which is amplified by an amplifier and reproduced as a sound signal from a speaker.

U.S. Pat. No. 4,190,819 discloses a motor vehicle audio information system having a programmable automotive tape recorder that can automatically deliver sequential prerecorded messages concerning road information and the like at predetermined intervals. An electromechanical adapter connected to the odometer system of the vehicle provides pulses that are proportional to the distance traveled and these pulses are fed into a microprocessor which performs arithmetic and logic functions to drive a tape recorder with prerecorded messages. The system permits the distance data for programming the microprocessor and the related sequential message to be stored directly on the tape such as a prerecorded cassette or for the distance data to be stored in the memory of the microprocessor with the sequential messages on the tape only.

There are also in the prior art sophisticated audio systems which provide sound or audio information which is indicative of the position of a craft, either on land, sea or in the air being monitored. One such prior art craft tracking system is disclosed in U.S. Pat. No. 5,153,836. The system of U.S. Pat. No. 5,153,836 allows the position of a plurality of craft, either on land, sea or air to be monitored. Each craft determines its own position using an existing position determining system such as a Global Positioning System. Each craft then transmits a radio frequency signal into which position information, preferably identifying information, and other messages, have been encoded. Each craft broadcast its position, identifying information, and other messages on a regular basis without the need for any interrogation signal. The broadcast position and identification information can be received by other craft and, since each craft has determined its own position, can be used to determine the proximity and identity of other craft. An audio alarm system is provided which is integrated with a computer to apprise the operator of a craft of a potential collision or other situation requiring attention.

While each of these prior art sound or audio systems are generally satisfactory for their intended purpose, that of providing position information to a craft either having such a system or tracking another craft which has an audio system for indicating position, these prior art audio systems have certain limitations. For example, such prior art audio devices for indicating position are generally built in to the craft which uses the system. In addition, their cost may be prohibitive preventing their use in, for example, automobiles, pleasure boats and small commercial aircraft.

There are also limitations with respect to the flexibility of these prior art audio or sound systems in that the systems require a predetermined or preprogrammed route to be followed by the craft using the system. Deviation from the preprogrammed route will cause system error resulting in the system being of little or no value to the user.

In addition, a number of these prior art audio or sound systems require a high degree of technical skills to operate thus significantly limiting the number of people who could use these systems.

Accordingly, there is a need for small, relatively simple in design, relatively inexpensive and highly reliable audio system which provides accurate position information to the user of a craft having such a system or the user of a craft tracking a vehicle or target having an audio system for indicating its position.

SUMMARY OF THE INVENTION

With the present invention, the foregoing problems are substantially solved. The present invention comprises an audio information apparatus for providing position information as to the location of a target comprising a global positioning system receiver affixed to the target for generating a string of fifty ASCII characters representing the latitude and longitude spherical coordinates of the target. The fifty ASCII characters are supplied to a microprocessor which converts a predetermined number of the fifty characters to a plurality of four bit addresses. The four bit addresses are supplied to a digital voice module which generates an analog audio voice signal in response to the four bit addresses. The analog audio voice signal which represents the location of the global positioning system receiver is supplied to a speaker. The speaker then broadcasts the exact location of the global positioning system receiver. The analog audio voice signal is also supplied to a transmitter for transmission of the signal to a ground station.

BRIEF DESCRIPTION OF THE DRAWINGS

FIG. 4 illustrates a flow chart for the Timer0 Interrupt Service Routine of the software of Appendix A; and FIGS. 5a–5c illustrates a flow chart for the Serial Port Interrupt Service Routine of the software of Appendix A.

DETAILED DESCRIPTION OF THE PREFERRED EMBODIMENT

Figure 1A:
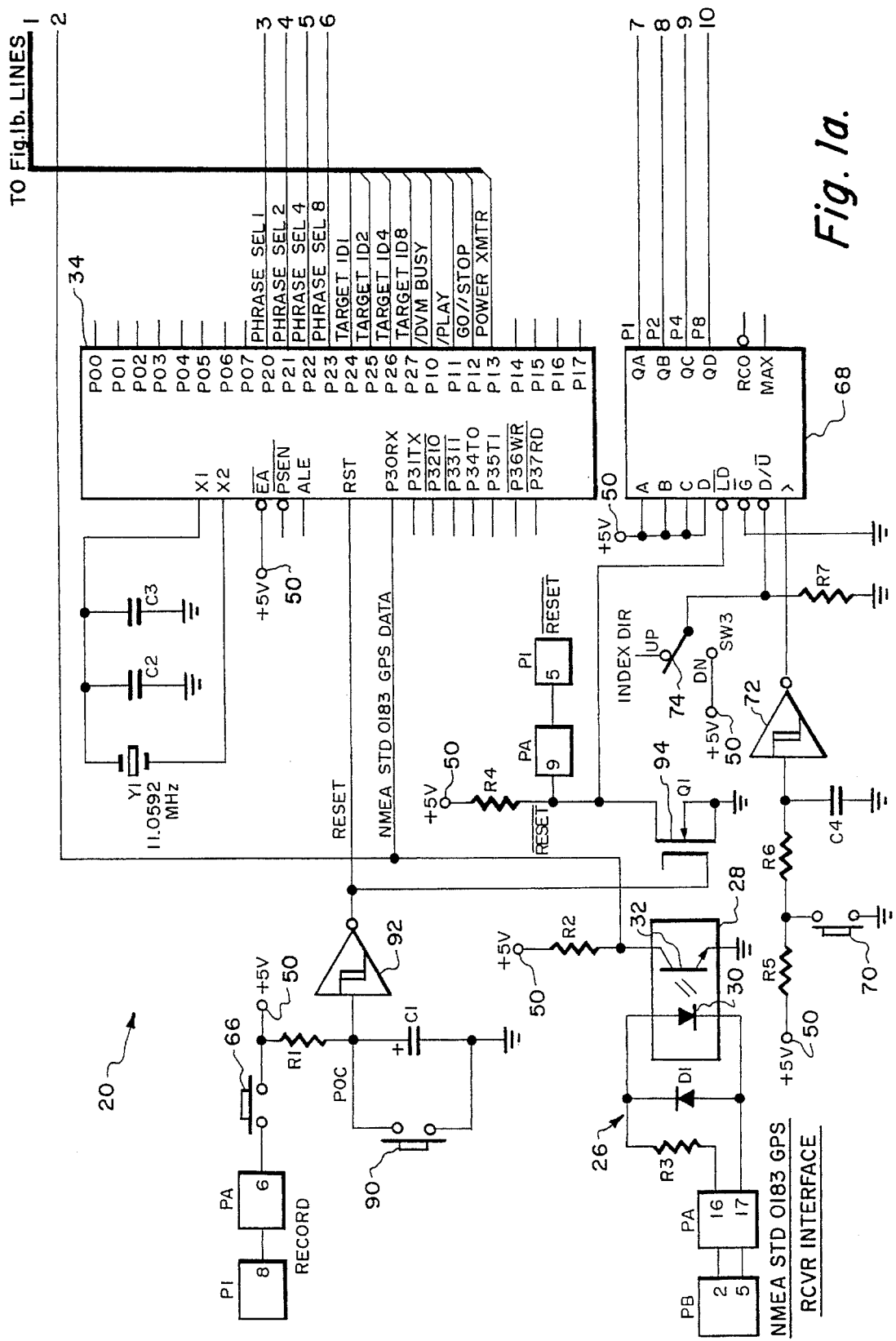
FIGS. 1a and 1b are a detailed electrical schematic of the electronics circuitry for the audio information apparatus for providing position information which constitutes the present invention.
Figure 1B:
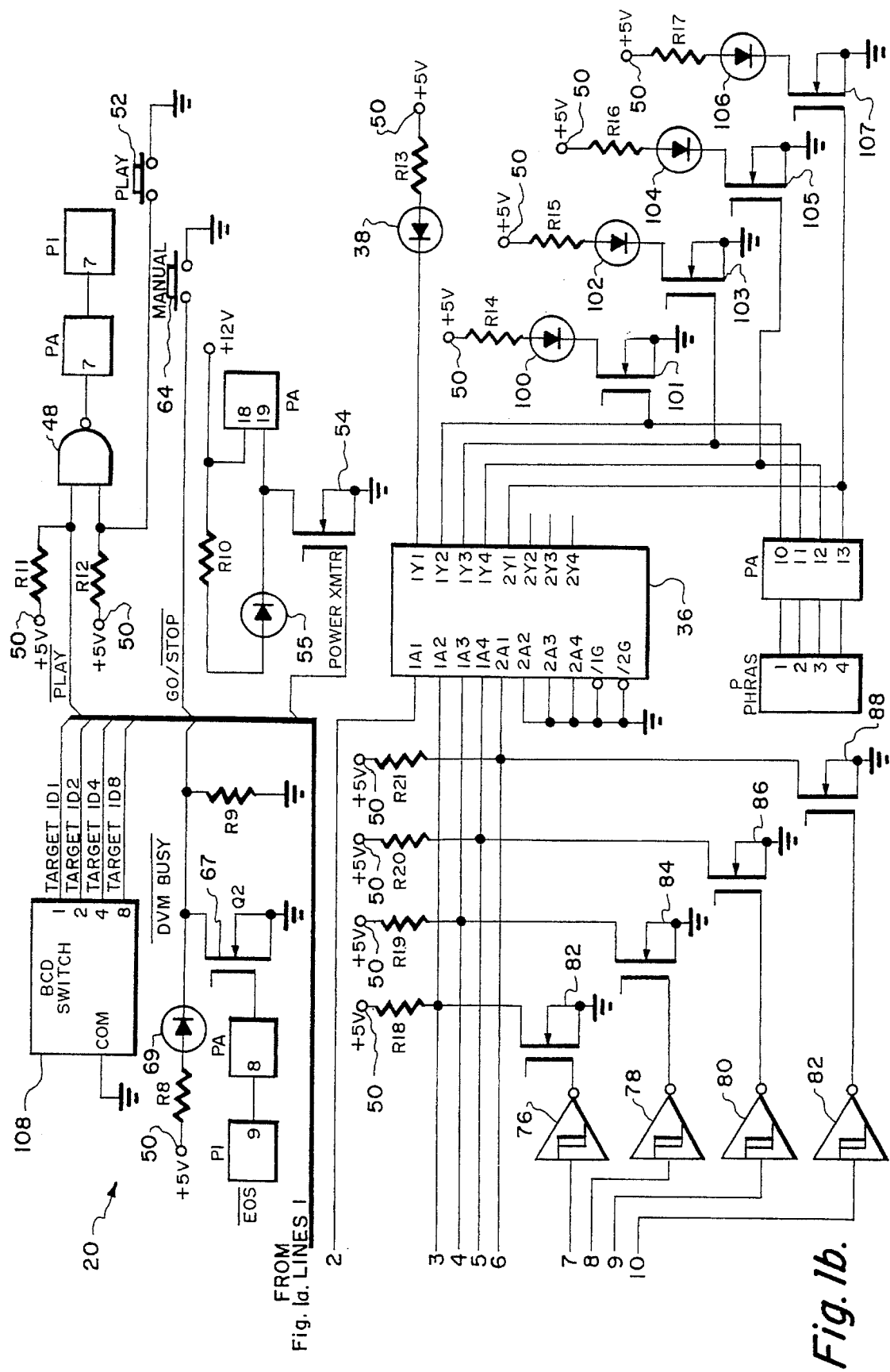
Figure 2:
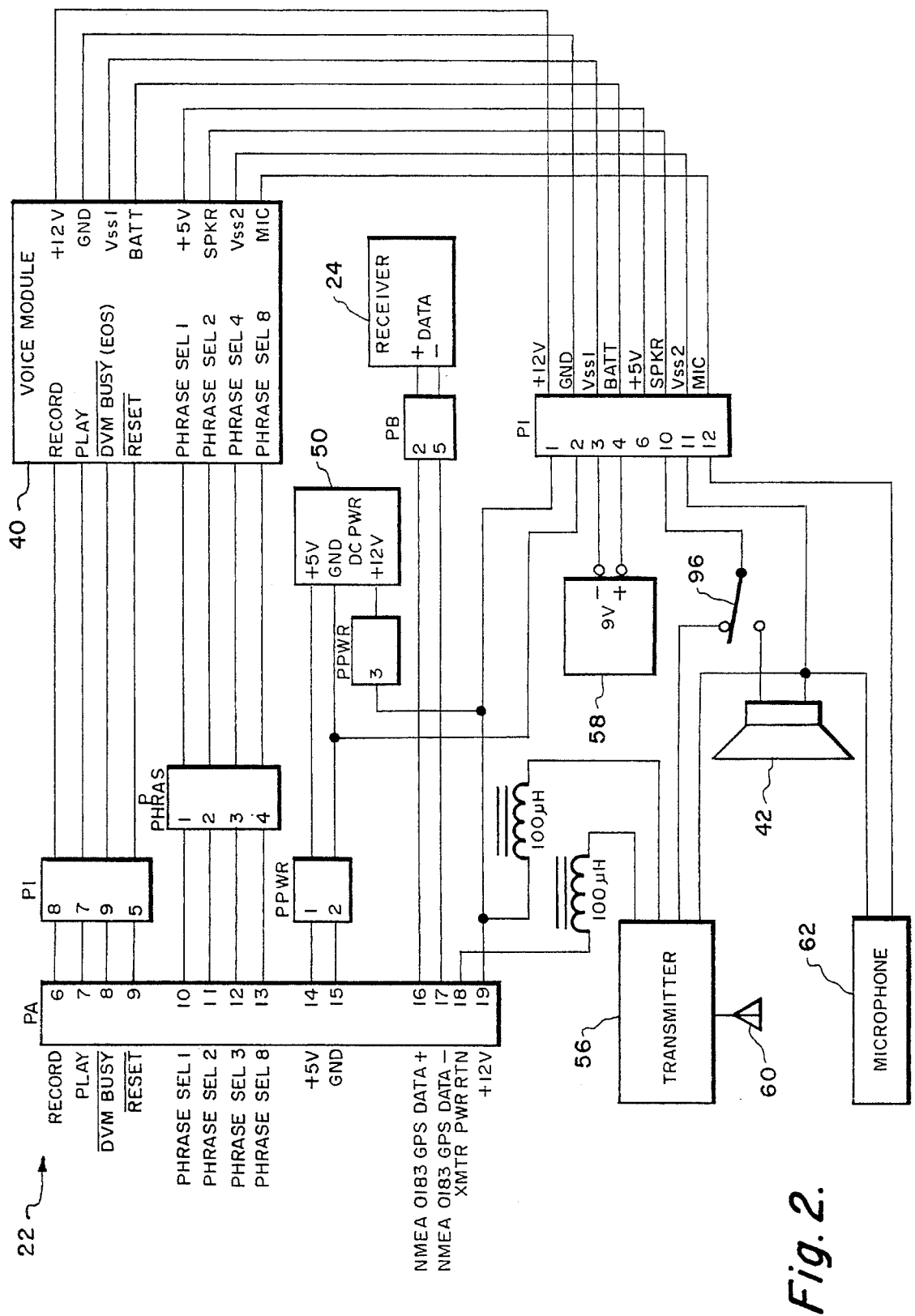
FIG. 2 is an electrical block diagram illustrating a transmitter, speaker and microphone of the present invention and the connections between the electronics circuitry of FIGS. 1a and 1b and the components thereof.

Referring first to FIGS. 1a, 1b and 2 there is shown the electronics circuit 20 for the audio information apparatus 22 constituting the present invention. Electronics circuit 20 receives position data from a global positioning system receiver 24 via a global positioning interface 26. Interface 26 includes an optical coupler 28 which is adapted to receive position data from the open collector driver of global positioning system receiver 24. When, for example, the light emitting diode 30 emits light (indicating a logic zero) transistor 32 is turned on causing a voltage drop of five volts across resistor R2 such that a zero volt signal is provided to the P30RX serial input of a microprocessor 34. Similarly when light emitting diode 30 is not emitting light (indicating a logic one), transistor 32 is turned off, causing a five volt signal to be supplied to the P30RX serial input of a microprocessor 34.

Interface circuit 26 is a NMEA standard 0183 global positioning receiver interface which allows circuit 20 to interface with any conventional and commercially available global positioning system receiver. The global positioning system receiver selected for use in the present invention is a Model GPS NAV 5000 PRO 5-channel global positioning receiver manufactured by Magellan Systems Corporation of San Dimas, Calif.

The collector of transistor 32 is also connected to the 1A1 input of a line driver 36, which has its 1Y1 output connected to the cathode of light emitting diode 38. Light emitting diode 38 provides a visual indication to the user of the present invention that position data is being received from global positioning system receiver 24.

Referring to the computer program listing for the software of microprocessor 34, which is set forth in Appendix A, receiver 24 provides a fixed message to microprocessor 34 which conveys position data from receiver 24 to microprocessor 34. This fixed message is a series of ASCII characters which for each character includes a start bit, eight data bits and a stop bit. The start bit is a logic zero and the stop bit is a logic one. The message also includes a checksum which is computed as each of the characters is provided to microprocessor 34 and then compared with a checksum provided with the message to verify that an error did not occur during message transmission.

The software of Appendix A initializes the P30RX serial input of microprocessor 34 to a baud rate of 4800 baud. Each ASCII character input to the P30RX serial input of microprocessor 34 generates an interrupt. The program counter of microprocessor 34 upon receiving the interrupt vectors to the interrupt service routine beginning at line 212 of the software of Appendix A. If the stop bit is correct "(bit #10)= 1" (line 218 of the software of Appendix A), there is a check to determine whether a "$" character has been received by microprocessor 34 If the received character is a "$" then a new message is being provided by receiver 24.

When the received character is a "$" the received character counter and the receiver character buffer pointer within microprocessor 34 are initialized. The pointer when initialized points to a starting address within the receive buffer or RAM memory of microprocessor 34 within which latitude position data (RBUF_LAT_10D, line 496 of Appendix A) from global positioning system receiver 24 is stored. The pointer is then incremented to allow for the storage of each additional ASCII character of position data from global positioning system receiver 24 within the receive buffer of microprocessor 34.

When the stop bit is not a logic one a bit or flag is set indicating that there is a stop bit error (line 218 of Appendix A). When the message is complete the software looks for any stop bit errors which have occurred during message transmission from receiver 24.

The message from global positioning system receiver 24 includes fifty ASCII characters which provide the position information for the current location of global positioning system receiver 24. Lines 232–239 of the software of Appendix A insure that only fifty characters of position information are processed by microprocessor 34.

If less than 51 characters are received by microprocessor 34, than the software of Appendix A jumps to line 240 (RCHAR_CTR_OK).

At line 241 the software of Appendix A looks up a response code indexed by the received character counter. For each ASCII character received by microprocessor 34 from global positioning system receiver 24 a response code is assigned with the codes being zero, one, two, three, four, five and six. Based upon the response code in the software of Appendix A for each ASCII character, the software of Appendix A branches to a routine to process the received ASCII character.

The first ASCII character provided to microprocessor 34 by receiver 24 is "G" (line 246 of Appendix A). The code assigned to the ASCII character "G" is a zero which results in a jump to line 296 of the software of Appendix A. The RESPOND routine moves the ASCII character "G" into checksum with the character "G" being the initial value of a newly computed checksum.

Each successive ASCII character with the exception of the last three ASCII characters are exclusive-ored into the checksum. Thus, for example, the second received ASCII character "P" is exclusive-ored with the character "G". The resulting computed checksum is then stored in the memory location within microprocessor 34 identified as checksum. The received character counter within microprocessor 34 is also incremented by a count of one for each ASCII character received by microprocessor 34. The incremented count, in turn, indicates the particular routine to be utilized in processing the received ASCII character.

At this time it should be noted that the LOC and OBJ codes are hexadecimal codes. For example at line 231 of the software of Appendix A the hexadecimal address 010D has a value of 32 hexadecimal which is the operation code for the return from interrupt instruction.

The ASCII character at line 255 of the software of Appendix A will be utilized for the purpose of illustrating the operation of the response table/lookup table (RESPONSE_TABLE) of Appendix A. The ASCII character at line 255 is the latitude tens of degrees character provided by global positioning system receiver 24. The response table for the tenth ASCII character tells the software to jump to line 296 which is the RESPOND routine. Since the respond code is a three, the software jumps through the RESPOND, RESPOND_TO_1, and RESPOND_TO_2 to the RESPOND_TO_3 routine at line 321. The ASCII character is then exclusive-ored into the checksum and saved, and the received character buffer pointer is incremented.

The forty eighth received ASCII character from receiver 24 is an the character "*" (line 293 of the software of Appendix A). This character is not processed by the software of Appendix A functioning as a delimiter. The forty ninth received character is the checksum ASCII tens value. The code of five (line 294) in the response table causes the software of Appendix A to jump to the RESPOND_TO_5 routine. The RESPOND_TO_5 routine converts the checksum ASCII tens value into its hexadecimal numerical equivalent. The fiftieth received character which is the checksum ASCII units value which is converted to its hexadecimal numerical equivalent by the RESPOND_

TO_6 routine which begins at line 342 of the software of Appendix A. A comparison is then made between the checksum provided by characters 49 and 50 and the computed checksum. If the comparison between the checksum provided by characters 49 and 50 and the computed checksum is not equal a jump occurs (line 345) to the DO_NOT_TRANSFER routine at line 359 of the software of Appendix A.

Receiver 24 also provides a validity bit which indicates whether the position data being supplied by receiver 24 to microprocessor 34 is valid. When the character is an "A" the data is valid, while a "V" indicates invalid position data. For invalid position data a flag is set indicating a validity error in the position data. Whenever a flag is set indicating a validity error or a stop bit error (lines 346 and 347) the software of Appendix A proceeds to the DO_NOT_TRANSFER routine at line 359 of the software of Appendix A.

When the checksum is validated and a stop bit error flag or a validity error flag is not set, then the position data is transferred to a transmit buffer within microprocessor 34. The only position data supplied to the transmit buffer within microprocessor 34 is data with a response code of three. This position data includes latitude data which is in tens of degrees (line 255), degrees (line 256), tens of minutes (line 257), minutes (line 258), tenths of minutes (line 260) and hundredths of minutes (line 261). North or South latitude direction is also provided by receiver 24 to microprocessor 34 and then transferred to the transmit buffer within microprocessor 34. The position data also includes longitude data which is in hundreds of degrees (line 265), tens of degrees (line 266), degrees (line 267), tens of minutes (line 268), minutes (line 269), tenths of minutes (line 271) and hundredths of minutes (line 272). East and west longitude direction is also provided by receiver 24 to microprocessor 34 and then transferred to the transmit buffer within microprocessor 34. The remaining position data provided by receiver 24 is not transferred to the transmit buffer within microprocessor 34.

At this time it should be noted that the microprocessor 34 used in the preferred embodiment of the present invention is an 8751H 8-bit microcontroller commercially available from INTEL corporation of Santa Clara, Calif.

Referring now to FIGS. 1a, 1b and 2 microcontroller 34 provides a logic zero strobe signal, identified as not play, whenever a four bit message is to be transferred from microcontroller 34 through line driver 36 to the phrase select one through four inputs of a digital voice module 40. The four bit messages which are set forth at lines 17-32 of the software of Appendix A, are utilized by module 40 to generate a voice message which provides latitude and longitude position information as to the exact location, for example, of a target having the global positioning system receiver 24 attached thereto. The position messages, which are addressed by hexadecimal codes, include the numbers zero through nine; the directions North, South, East and West; the phrase "target" and the phrase "point". The position messages are processed by module 40 which then provides an analog audio voice signal representing the location of receiver 24 to a speaker 42. Speaker 42 then broadcast a digitized voice which provides the exact location of global positioning system receiver 24.

Referring to FIGS. 1a and 1b, microprocessor 34 provides an active low signal (/play) at its P11 output whenever a position message is to be broadcast by speaker 42 which is then supplied to the first input of a NAND gate 48. The second input of NAND gate 48 is connected through a resistor R12 to a direct current voltage source 50. When a normally open push button 52 is in the open position (as shown in FIG. 1b) a +5 VDC signal is supplied by source 50 to the second input of NAND gate 48 enabling NAND gate 48 which results in a logic one play signal at the output of NAND gate 48. This logic one play signal is then supplied to the play input of digital voice module 40.

In a like manner, when the P11 output of microprocessor 34 is at the logic one state, closing push button 52 generates a logic one at the output of NAND gate 48 since the second input of NAND gate 48 is now at the logic zero state.

Microprocessor 34 also provides at its P13 output a logic one signal which is supplied to the gate of a field effect transistor 54 turning on field effect transistor 54. At line 137 of the software listing of Appendix A this logic one is provided to transistor 54 by microprocessor 34. When field effect transistor 54 is turned on +12 VDC is supplied by direct current voltage source 50 to a transmitter 56 turning on transmitter 56. Turning on power to transmitter 56 allows transmitter 56 to transmit via antenna 60 position messages at a frequency within, for example, the radio frequency range from digital voice module 40. There is also provided a light emitting diode 55 which indicates that transmitter 56 is in a powered up state.

It should be noted that a switch 96 is used to connect either speaker 42 or transmitter 56 to the SPKR output of digital voice module 40 allowing the user of audio information apparatus 22 to provide position information via either speaker 42 or transmitter 56.

Electronics circuit 20 also includes a normally open push button 64 which when closed provides a logic zero to the P12 input of microprocessor 34. A logic zero at the P12 input of microprocessor 34 causes the Main Program of the software of Appendix A to enter into a continuous loop. When this occurs, the user of audio information apparatus 22 may record audio information via microphone 62 onto digital voice module 40. The user then closes normally open push button 66 providing a logic one to the record input of digital voice module 40 which allows module 40 to receive and record audio signals from microphone 62.

Digital voice module 40 provides at its /DVM BUSY (EOS) output a logic zero signal which is supplied to the gate input of a field effect transistor 67 turning on field effect transistor 67. When field effect transistor 67 is turned on, a logic zero signal (/DVM BUSY) is supplied to the P10 input of microprocessor 34 indicating that module 40 is busy. A light emitting diode 69 is also provided which functions as an indicator as to when digital voice module 40 is busy.

Microprocessor 34 provides at its P20, P21, P22 and P23 outputs the four bit message address to be transferred from microprocessor 34 through line driver 36 to the phrase select one through four inputs of digital voice module 40. For example, when the message to be played by module 40 is the phrase "NORTH" the logic signals occurring at the P23, P22, P21 and P20 outputs of microprocessor 34 are respectively 1,0,1,0 (hexadecimal A). A logic zero pulse will next occur at the P11 output of microprocessor 34 resulting in a logic one pulse at the output of NAND gate 48 causing module 40 to play the message "NORTH". In a like manner, when the message to be played by module 40 is the phrase "THREE" the logic signals occurring at the P23, P22, P21 and P20 outputs of microprocessor 34 are respectively 0,0,1,1 (hexadecimal 3). A logic zero pulse will next occur at the P11 output of microprocessor 34 resulting in a logic one pulse at the output of NAND gate 48 causing module 40 to play the message "THREE".

Electronics circuit 20 also includes a normally open push button 90 which the user of audio information apparatus 22 may close to reset microprocessor 34 and a four bit up/down counter 68. Closing button 90 provides a logic zero at the input of a Hex Schmitt-Trigger inverter 92 which inverts the logic zero to a logic one resetting microprocessor 34. It should be noted that closing button 90 results in a five volt drop across resistor R1 so that the input of inverter 92 is at zero volts. When button 90 is open, capacitor C1 momentarily maintains the input of inverter 92 at the logic one state. The combination of capacitor C1 and resistor R1 provide a power on reset pulse.

The logic one which occurs at the output of inverter 92 when button 90 is closed is supplied to the gate of a field effect transistor 94. This logic one at the gate input of field effect transistor 94 turns on transistor 94 resulting in a logic zero being providing to the /LD (not load) input of counter 68. This logic zero loads the logic ones at the A, B, C and D inputs of counter 68 to the QA, QB, QC and QD outputs of counter 68. These logic ones are supplied to the inputs of Hex Schmitt-Trigger inverter 76, 78, 80 and 82 with each inverter 76, 78, 80 and 82 inverting the logic one at its input to a logic zero. The logic zeros are then supplied to the gate inputs of field effect transistor 82, 84, 86 and 88 keeping the field effect transistors 82, 84, 86 and 88 turned off. Resistors R18, R19, R20 and R21 function as pull up resistors.

Electronics circuit 20 further includes a normally open push button 70 which the user of audio information apparatus 22 may close to increment or decrement counter 68 depending upon the position of a switch 74. When switch 74 is set so as to connect direct current voltage source 50 to the D/U input of counter 68, +5 VDC is provided to the D/U input of counter 68. This results in counter 68 counting down from 1,1,1,1. Similarly, when switch 74 is set in the position shown in FIG. 1a, a logic zero is supplied to the D/U which results in counter 68 counting up from 1,1,1,1.

A normally open push button 68 is used to index counter 70. Closing push button 70 results in a +5 VDC to zero volt transition (logic one to zero transition) at the input of a Hex Schmitt-Trigger inverter 72 since there is a volt drop across resistor R5. Capacitor C4 is then charged resulting in a clock pulse being supplied to the input of inverter 72. This clock pulse is inverted and shaped as square wave by Schmitt trigger inverter 72 and then supplied to the clock input of counter 68. If counter 68 is operating in an up count mode the logic zero to one transition at the clock input of counter 68 will result in 0,0,0,0 respectively at the QA, QB, QC and QD outputs of counter 68. These logic zeros are next inverted by Hex Schmitt-Trigger inverters 76, 78, 80 and 82 resulting in logic ones being supplied to the gate inputs of field effect transistors 82, 84, 86 and 88. These logic ones turn on transistors 82, 84, 86 and 88 resulting in logic zeros being supplied through the 1A1, 1A2, 1A3 and 1A4 inputs of driver 36 to the PHRASE SEL 1, PHRASE SEL 2, PHRASE SEL 3 and PHRASE SEL 4 inputs of digital voice module 40. The user of audio information apparatus 22 may then record a phrase at the address 0,0,0,0 for digital voice module 40 by using the record feature of voice module 40.

At this time it should be noted that the digital voice module used in the preferred embodiment of the present invention is a Model DVM-58 voice module manufactured by MING Engineering and Products, Inc. of Alhambra, Calif.

When push button 70 is again closed a clock pulse is supplied to the clock input of counter 68 resulting in a count of 1,0,0,0 respectively at the QA, QB, QC, and QD outputs of counters 68. Inverters 76, 78, 80 and 82 invert the 1,0,0,0 to 0,1,1,1 resulting in a logic zero at the gate of transistor 82 and ones at the gates of transistors 84, 86 and 88. Only transistors 84, 86 and 88 are turned on resulting in a logic one being supplied through driver 36 to the PHRASE SEL 1 input of digital voice module 40 and logic zeros being supplied driver 36 to the PHRASE SEL 2, PHRASE SEL 3 and PHRASE SEL 4 inputs of digital voice module 40. The user of audio information apparatus 22 may then record a phrase at the address 0,0,0,1 for digital voice module 40 by using the record feature of voice module 40. As shown at lines 17 and 18 of the software listing of Appendix A the phrase "ZERO" is recorded at address 0,0,0,0 of digital voice module 40 and the phrase "ONE" is recorded at the address 0,0,0,1 of digital voice module 40. Light emitting diodes 100, 102, 104 and 106 indicate to the user of audio information apparatus 22 the binary count being supplied to the PHRASE SEL 1, PHRASE SEL 2, PHRASE SEL 3 and PHRASE SEL 4 inputs of digital voice module 40 by counter 68 or microprocessor 34. When, for example, the count is 1,1,1,1 field effect transistors 101, 103, 105 and 107 are each turned on resulting in light emitting diodes 100, 102, 104 and 106 being lit. This, in turn, allows the user of apparatus 22 to read the count.

It should be noted that the digital voice module used in the preferred embodiment of the present invention allows up to sixteen phrases or messages to be recorded and then played at the addresses provided to the PHRASE SEL 1, PHRASE SEL 2, PHRASE SEL 3 and PHRASE SEL 4 inputs of the digital voice module 40. The sixteen messages recorded into digital voice module 40 are set forth at lines 17 through 32 of the software listing of Appendix A. These sixteen messages allow the user of apparatus 22 to hear via the digitized voice provided by speaker 42 the receiver's exact location in latitude and longitude spherical coordinates.

Electronics circuit 20 also includes a target ID select circuit 108 which may be used for locating a target when global positioning system receiver 24 is attached to a target. Circuit 108, which may be any commercially available binary coded decimal switch, provides a four bit code to the P24, P25, P26 and P27 inputs of microprocessor 34 identifying the target which the user is attempting to locate.

The operation of audio information apparatus 22 will now be discussed in detail. At lines 138–140 of the software of Appendix A transmitter 56 is powered up by microprocessor 34 when microprocessor 34 provides a logic one to the base of transistor 54 turning on transistor 54 which allows +12 VDC to be supplied to transmitter 56. One half second is then provided to stabilize the transmitter 56 (line 142).

The phrase "target" is next transmitted by first providing the address 1,1,1,0 respectively to the PHRASE SEL 4, PHRASE SEL 3, PHRASE SEL 2 and PHRASE SEL 1 inputs of the digital voice module 40 and then calling the subroutine PRESS_PLAY (lines 467–475). This subroutine causes microprocessor 34 to provide a 0.1 second play pulse to the play input of module 40 which, in turn, results in transmitter 56 transmitting via antenna 60 the phrase "target".

When a logic zero signal (/DVM BUSY) is supplied to the P10 input of microprocessor 34 indicating that module 40 is busy, the PRESS_PLAY subroutine is not operational.

If a position information update has been provided by global positioning system receiver 24 within the previous sixty seconds, that is receiver 24 has provided updated or new position data then the software of Appendix A jumps to line 147 by setting an update flag. If new position data has not been supplied to microprocessor 34 by receiver 24 then the phrase "target" is again transmitted indicating stale data.

At lines 147-154 of the software of Appendix A, the target identification is broadcast. The update flag is first cleared (line 148). The target identification is first read from the target ID select circuit 108 and then the target identification number is broadcast in the form of an analog audio voice signal to transmitter 56 which then transmits the signal via antenna 60.

At this time it should be noted that a complement of the target identification is provided by target ID select circuit 108. The software of Appendix A complements the target identification number before the address for the target identification is supplied to the PHRASE SEL 1, PHRASE SEL 2, PHRASE SEL 3 and PHRASE SEL 4 inputs of digital voice module 40.

A one second delay is provided in the software of Appendix A before the addresses for latitude and longitude spherical coordinates are supplied from microprocessor 34 to digital voice module 40.

A pointer is next initialized to the beginning of the transmit buffer within microprocessor 34 (line 157 of the software of Appendix A). A pointer R0 is initialized to the first address (#TBUF_START) in the transmit buffer of microprocessor 34 which has the position information to be transferred to digital voice module 40. A subroutine PLAY_R4_TBUF_DIGITS (lines 407-418) is then called (line 159) to effect the transfer of position data.

The PLAY_R4_TBUF_DIGITS subroutine is used to supply the addresses for the tens and units of degrees latitude spherical coordinate to digital voice module 40.

For example, if the latitude spherical coordinate is 28° the PLAY_R4_TBUF_DIGITS subroutine is first used to supply the address for two which is 0,0,1,0 followed by the address for eight which is 1,0,0,0. Each address 0,0,1,0 and 1,0,0,0 is transferred from the transmit buffer within microprocessor 34 to the digital voice module 40 by the PLAY_R4_TBUF_DIGITS subroutine (line 408). Register R4 specifies the number of addresses to be transferred to voice module 40.

It should also be noted that PRESS_PLAY subroutine provides for the logic zero signal (/DVM BUSY) from digital voice module 40 which indicates that module 40 is busy and can not accept new position data. Whenever digital voice module 40 is not busy, the PRESS_PLAY subroutine sets the P11 output to the logic zero state for 0.1 seconds strobing each message address into digital voice module 40.

At line 161 the software of Appendix A uses the PLAY_R4_TBUF_DIGITS subroutine to transfer the addresses for whole minutes latitude to voice module 40 followed by the address for point which is 1,1,1,1 with this address being transferred to voice module 40 using the PRESS_PLAY subroutine (line 163).

The addresses for the hundredths of minutes of latitude are next transferred to voice module 40 using the PLAY_R4_TBUF_DIGITS subroutine (line 165).

At line 166 the address for latitude direction is transferred to voice module 40 using the PLAY_TBUF_DIR subroutine (lines 424-440 of the software of Appendix A.) The address for the direction "NORTH" is 1,0,1,0 (hexadecimal A) while the address for "SOUTH" is 1,0,1,1 (hexadecimal B).

The subroutine PLAY_TBUF_DIR first checks for the ASCII character "N" which indicates the direction North. If the ASCII character is not "N" then the subroutine jumps to line 429 and searches for the ASCII character "S". If the ASCII character is not "S" then the subroutine jumps to line 432 and searches for the ASCII Character "E". If the ASCII character is not "E" the subroutine jumps to line 435 which includes the binary four bit address 1,1,0,1 for the direction west. The PRESS_PLAY subroutine at line 437 effects the transfer of the direction address from microprocessor 34 to digital voice module 40.

Beginning at line 168 the software of Appendix A first effects a transfer of three addresses for degrees of longitude, followed by a transfer of two addresses for whole minutes of longitude and the address for the phrase "POINT" and then a transfer of two addresses for hundredths of minutes of longitude to digital voice module 40. The address for the direction East or West is next transferred to digital voice module 40.

At line 178 the power to transmitter 56 is turned off, that is field effect transistor 54 is turned off which eliminates the ground return path from transmitter 56. There is a sixty second delay (line 187) before the next latitude and longitude position coordinate addresses are transferred to digital voice module 40.

Referring to the RESPONSE_TABLE beginning at line 245 of the software of Appendix A whenever microprocessor 34 receives one of the fifty characters from global positioning system receiver 24, a jump occurs to process the character. For example, when the response code is three which is the response code for latitude and longitude position characters jumps occur to line 321.

The received ASCII character code is exclusive-ored into the checksum (line 324). The received character is copied to the receive buffer within microprocessor 34 and the received character buffer pointer is then incremented.

At line 293 of the RESPONSE_TABLE the forty eighth character is received which is normally an ",". The response code for the forty eighth character is four causing a jump to line to 331. When the forty eighth character is an "," the character is not processed and serves only as a delimiter.

The forty ninth character read into microprocessor 34 from global positioning system receiver 24 is the checksum tens ASCII code for the numerical tens value of the checksum which is converted to a real number (line 337). Similarly, the fiftieth character read into microprocessor 34 from global positioning system receiver 24 is the checksum units ASCII code for the numerical units value of the checksum which is converted to a real number (line 343). The resultant real number checksum after conversion from ASCII code has a hexadecimal value.

When global positioning system receiver 24 is transferring position data to microprocessor 34, receiver 24 is calculating a checksum in exactly the same manner as microprocessor 34. If the checksum calculated by receiver 24 which is received characters 49 and 50 is not equal to the checksum calculated by microprocessor 34 then a jump occurs to line 359 which is DO_NOT_TRANSFER.

Receiver 24 also provides the validity character which is the eighth character. When the character is the ASCII character "V" indicating invalid data a jump occurs to line 359 of the software of Appendix A. Similarly, if a stop bit is not received during a character transfer, the software of Appendix A jumps to line 359. A jump to line 359 prevents the incorrectly received longitude and latitude information from being copied from the received buffer to the transmit buffer of microprocessor 34 for transfer to digital voice module 40.

Whenever a jump to line 359 does not occur latitude and longitude position data is copied from the receive buffer to the transmit buffer for transfer to digital voice module 40.

The update flag is set (line 358) indicating valid position data has been received from global positioning system receiver 24, used registers are popped or removed from the stack and there is a return to the Main Program.

It should be understood that the software for microprocessor 34 exits the Main Program whenever an interrupt occurs indicating that position data is to be transferred from receiver 24 to microprocessor 34. The software then enters the SERIAL_PORT_ISR interrupt service routine, processes the position data from receiver 24 and returns to the Main Program at the address from which it exited the Main Program.

Figure 3A:
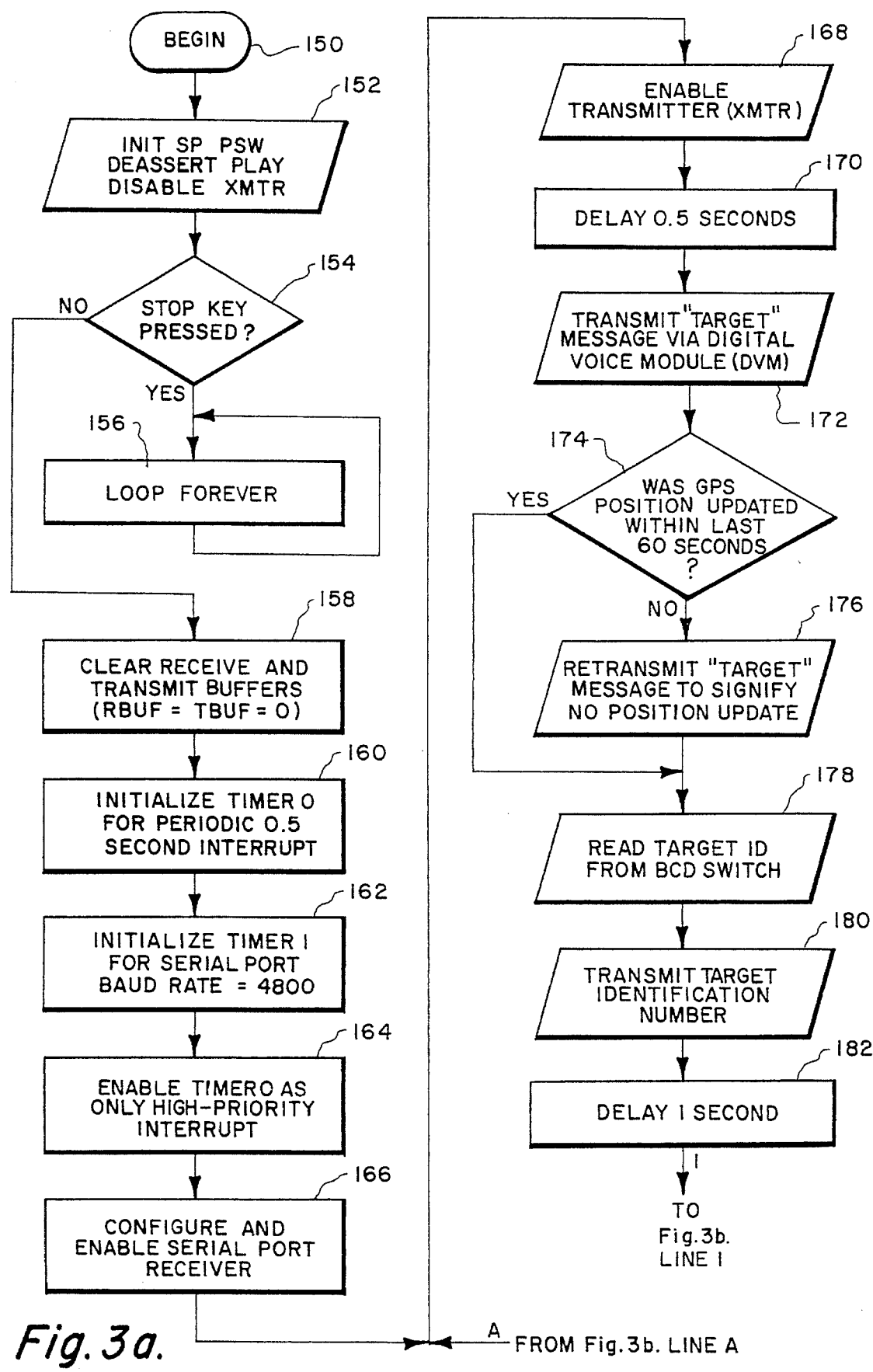
FIGS. 3a–3b illustrates a flow chart for the main program of the software of Appendix A.
Figure 3B:
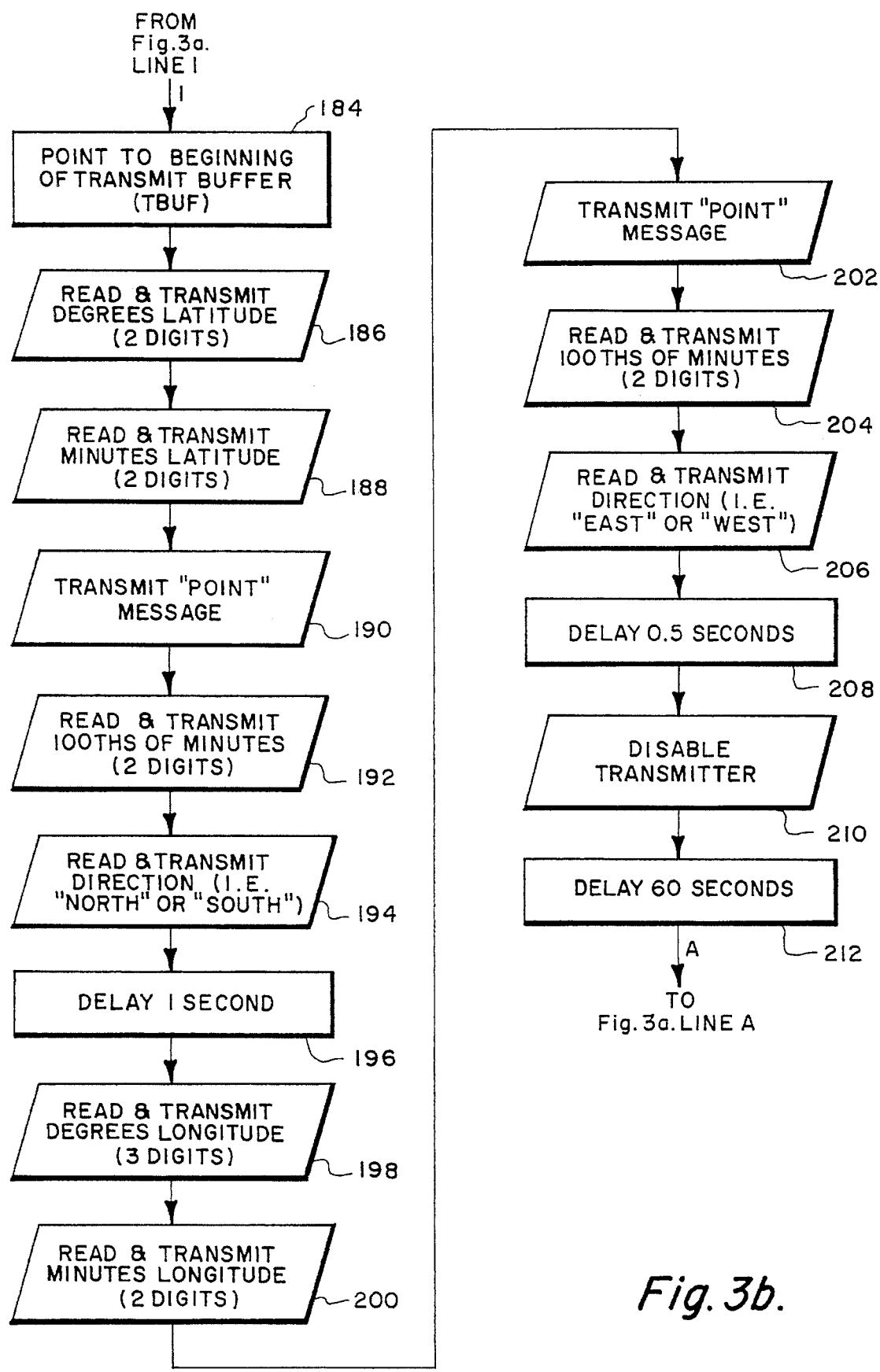

FIGS. 3a–3b illustrate a flow chart (program steps 150–212) for the Main Program of the software of Appendix A (lines 38–188) which is used to transfer latitude and longitude spherical coordinate addresses from microprocessor 34 to digital voice module 40. FIG. 4 illustrates a flow chart (program steps 220–226) for an interrupt service routine TIMER0_ISR (lines 199–206 of the software of Appendix A). This interrupt service routine reinitializes a 16-bit counting register for a Timer 0 within microprocessor 34, enables Timer 0 and then increments a sixty second timer counter and a relative timer counter within microprocessor 34 before returning to the main program.

Figure 5B:
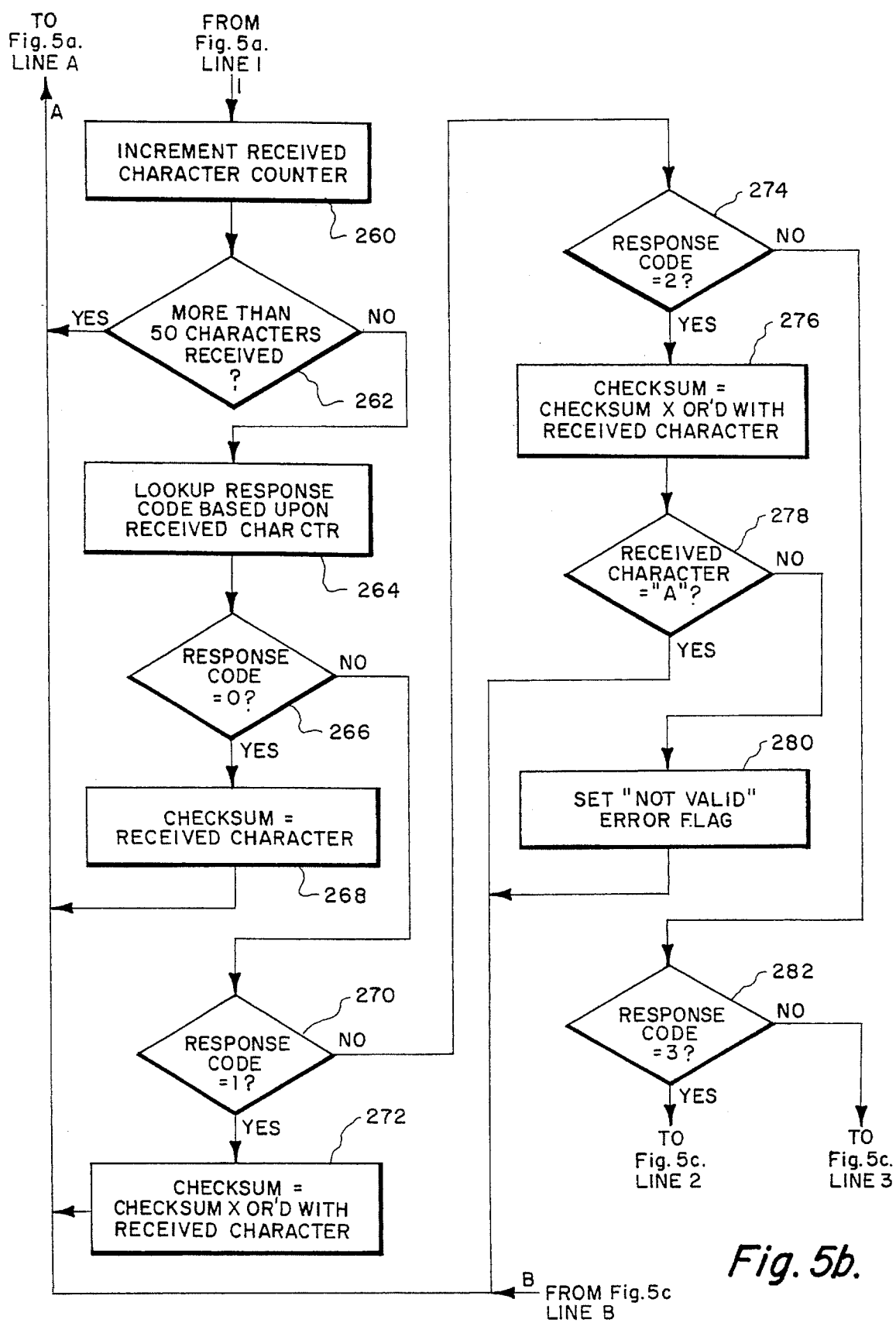
Figure 5C:
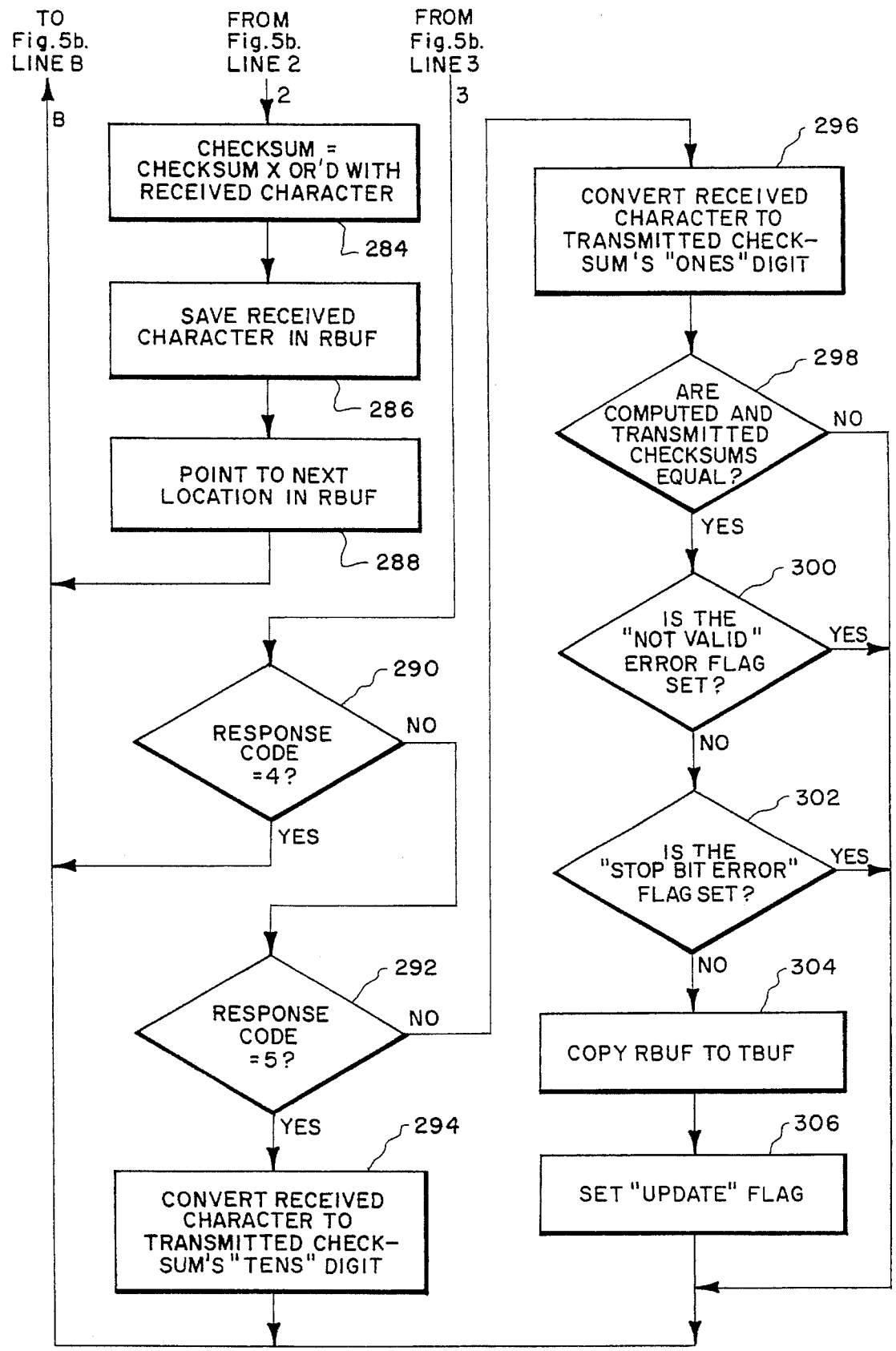

FIGS. 5a–5c illustrates a flow chart (program steps 230–306) for the interrupt service routine SERIAL_PORT_ISR (lines 212–361 of the software of Appendix A). This interrupt service routine effects the transfer of the fifty ASCII characters of position data from the global positioning system receiver 24 to microprocessor 34.

From the foregoing description, it may readily be seen that the present invention comprises a new, unique and exceedingly useful audio information apparatus for providing position information as to the location of a target or the like which constitutes a considerable improvement over the known prior art. Obviously many modifications and variations of the present invention are possible in light of the above teachings. It is therefore to be understood that within the scope of the appended claims, the invention may be practiced otherwise than as specifically described.

Appendix A

MCS-51 MACRO ASSEMBLER    MAGIC3.ASM                                                01/26/93

DOS 3.30 (038-N) MCS-51 MACRO ASSEMBLER, V2.2
OBJECT MODULE PLACED IN MAGIC3.OBJ
ASSEMBLER INVOKED BY:  C:\ICEDIR\ASM51.EXE MAGIC3.ASM

```
LOC  OBJ         LINE    SOURCE

1       $DEBUG NOPAGING TITLE(MAGIC3.ASM)
                 2
                 3       ;*********************************************************************
                 4       ;
                 5       ; This is 8751 code for the MAGIC GPS-to-voice target
                 6       ; locating   system.
                 7       ;
                 8       ;     Written by: Guy R. Buchwitz
                 9       ;           Date: January 26, 1993
                 10      ;        Version: 1.4
                 11      ;
                 12      ;*********************************************************************
                 13      ;
                 14      ;    The following messages are expected to be stored as follows:
                 15      ;
                 16      ;    CODE       MESSAGE
                 17      ;    0000   0h  "ZERO"
                 18      ;    0001   1h  "ONE"
                 19      ;    0010   2h  "TWO"
                 20      ;    0011   3h  "THREE"
                 21      ;    0100   4h  "FOUR"
                 22      ;    0101   5h  "FIVE"
                 23      ;    0110   6h  "SIX"
                 24      ;    0111   7h  "SEVEN"
                 25      ;    1000   8h  "EIGHT"
                 26      ;    1001   9h  "NINE"
                 27      ;    1010   Ah  "NORTH"
                 28      ;    1011   Bh  "SOUTH"
                 29      ;    1100   Ch  "EAST"
                 30      ;    1101   Dh  "WEST"
                 31      ;    1110   Eh  "TARGET"
                 32      ;    1111   Fh  "POINT"
                 33      ;
                 34      ;*********************************************************************
                 35
                 36
                 37      ;    Assign symbolic names to constants
004C             38          P05_SEC_HI    EQU   04Ch   ;TIMER0 high-byte preload for 0.05 sec.
0000             39          P05_SEC_LO    EQU   00h    ;   "    low-byte     "    "   "   "
                 40                                     ;(11.0592 MHz/12)*0.05 sec = 46,080
                 41                                     ;(2^16 - 46,080 = 19,456 = 4C00h)
0004             42          IXD_HI        EQU   04h    ;Inter Transmission Delay (high byte for 60 sec.)
00B0             43          IXD_LO        EQU   0B0h   ;   "       "        "      low  "   "   "   "
                 44                                     ;(IXD = No. of .05 sec. intervals between msgs)
00FA             45          BAUD_4800     EQU   0FAh   ;TIMER 1 reload value for 4800 Baud (11.0592MHz)
000E             46          BUF_LENGTH    EQU   14     ;Length of receive/transmit buffers
                 47
0090             48          nBUSY         BIT   P1.0   ;(I) Low when MING is busy
0091             49          nPLAY         BIT   P1.1   ;(O) uC lowers to initiate MING play mode
0092             50          GO            BIT   P1.2   ;(I) High if STOP key not pressed at RESET
                 51                                     ;(Perm\Bits uC suspension for manual operation)
0093             52          EN_XMTR       BIT   P1.3   ;Set to gate +12v return from xmtr via MOSFET
                 53                                     ;Note: EN_XMTR is used optionally in MAGIC3.ASM
```

```
                    54
0094                55      PULSE_ON      BIT  P1.4   ;Pulsed high to set XMTR/DVM? power relay on
0095                56      PULSE_OFF     BIT  P1.5   ;  "      "     "  reset    "      "     "   off
                    57
----                58              CSEG              ;Beginning of CODE segment
0000                59              ORG  0000h        ;Reset vector
0000 020026         60      BEGIN:  JMP  INIT
                    61
000B                62              ORG  000Bh        ;TIMER0 (0.05 second) vector
000B 0200D8         63              JMP  TIMER0_ISR
                    64
0023                65              ORG  0023h        ;Serial port vector
0023 0200E6         66              JMP  SERIAL_PORT_ISR
                    67
0026 75815F         68      INIT:   MOV  SP,#5Fh      ;Reserve 32 bytes for stack (#60h-7Fh)
0029 75D000         69              MOV  PSW,#00h     ;Reset status flags & select register bank 0
002C 7590C7         70              MOV  P1,#0C7h     ;Deassert *PLAY, disable transmitter
                    71                                ;  (neither XMTR/DVM? power relay coil is on)
002F 75A0FF         72              MOV  P2,#0FFh     ;... all other pins are inputs
                    73
0032 209202         74      STOP?:  JB   GO,Continue  ;Continue if STOP not pressed
0035 80FE           75              JMP  $            ;Else, loop until RESET
                    76
                    77      CONTINUE:
0037 7827           78              MOV  R0,#RBUF_START ;Clear buffers
0039 7936           79              MOV  R1,#TBUF_START
003B 7A0E           80              MOV  R2,#BUF_LENGTH
                    81      CLEAR_BUF_LOOP:
003D 7600           82              MOV  @R0,#0
003F 08             83              INC  R0
0040 7700           84              MOV  @R1,#0
0042 09             85              INC  R1
0043 DAF8           86              DJNZ R2,CLEAR_BUF_LOOP
                    87
                    88      INITIALIZE_REGISTERS:
0045 758921         89              MOV  TMOD,#21h
                    90                      ;MODE = 01 - TIMER0 = 16 bits wide
                    91                        ;C/t = 0 - TIMER0 = timer (not a counter)
                    92                        ;GATE = 0 - TIMER0 is not gated
                    93                      ;MODE = 10 - TIMER1 = 8-bit auto-reload (baud rate gen.)
                    94                        ;C/t = 0 - TIMER1 = timer (not a counter)
                    95                        ;GATE = 0 - TIMER1 is not gated
0048 758C4C         96              MOV  TH0,#P05_SEC_HI ;Initiate TIMER0 for first 0.05 sec int
004B 758A00         97              MOV  TL0,#P05_SEC_LO
004E 758DFA         98              MOV  TH1,#BAUD_4800 ;Init TIMER1 as BRG for 4800 baud
0051 758BFA         99              MOV  TL1,#BAUD_4800 ;... (init standard and auto-reload counters)
0054 75B802        100              MOV  IP,#02h
                   101                      ;PX0 = 0 - INT0 (unused) = lower priority
                   102                      ;PT0 = 1 - TIMER0 int = higher priority
                   103                      ;PX1 = 0 - INT1 (unused) = lower priority
                   104                      ;PT1 = 0 - TIMER1 int (unused for BRG) = lower priority
                   105                      ;PS  = 0 - SERIAL PORT int = lower priority
                   106                      ;PT2 = 0 - N/A
                   107                        ;X = 0 - Reserved
                   108                        ;X = 0 - Reserved
0057 75A892        109              MOV  IE,#92h
                   110                      ;EX0 = 0 - Disable INT0
                   111                      ;ET0 = 1 - Enable TIMER0 (0.05 second) interrupt
                   112                      ;EX1 = 0 - Disable INT1
                   113                      ;ET1 = 0 - Disable TIMER1 (BRG) interrupt
                   114                      ;ES  = 1 - Disable serial port interrupt until needed
                   115                      ;ET2 = 0 - Disable TIMER2 interrupt
                   116                        ;X = 0 - RESERVED
                   117                      ;EA  = 1 - Globally enable interrupts
005A 759870        118              MOV  SCON,#70h
                   119                      ;RI = 0 - Reset pending serial port receiver int
                   120                      ;TI = 0 - Reset pending serial port transmitter int
```

```
                        121              ;RB8 = 0 - Reset pending received stop bit
                        122              ;TB8 = 0 - Reset pending transmitted stop bit
                        123              ;REN = 1 - Enable serial port receiver
                        124              ;SM2 = 1 - Do not set RI unless valid stop bit received
                        125              ;SM1 = 1 - 1 start bit (0), 8 data bits, 1 stop bit (1)
                        126              ;SM0 = 0 - ...->RB8, variable baud rate (4800)
005D 758850             127         MOV  TCON,#50h
                        128              ;IT0 = 0 - INT0 is low-level triggered
                        129              ;IE0 = 0 - Reset INT0 interrupt flag
                        130              ;IT1 = 0 - INT1 is low-level triggered
                        131              ;IE1 = 0 - Reset INT0 interrupt flag
                        132              ;TR0 = 1 - Enable TIMER0 (0.05 sec)
                        133              ;TF0 = 0 - Reset pending TIMER0 overflow flag
                        134              ;TR1 = 1 - Enable TIMER1 (BRG)
                        135              ;TF1 = 0 - Reset pending TIMER1 overflow flag
                        136
                        137    MAIN_LOOP:
0060 D293               138         SETB EN_XMTR        ;Gate power return from transmitter
0042 D294               139         SETB PULSE_ON       ;Set XMTR/DVM? power relay on
0064 1201C0             140         CALL DLY_P1S
0067 C294               141         CLR  PULSE_ON
0069 1201C9             142         CALL DLY_P5S        ;Allow 0.5 sec for xmtr to stabilize
006C 75A0FE             143         MOV  P2,#0FEh       ;Transmit "TARGET"
006F 120223             144         CALL PRESS_PLAY
0072 200003             145         JB   UPDATE,SEND_TARGET_ID ;Jump if position updated in last 60 sec.
0075 120223             146         CALL PRESS_PLAY     ;Else restate "TARGET" to signal loss of GPS fix
                        147    SEND_TARGET_ID:
0078 C200               148         CLR  UPDATE         ;Ensure UPDATE is reset for next 60 sec.
007A E5A0               149         MOV  A,P2           ;Read target ID (upper nibble of P2)
007C C4                 150         SWAP A              ;Target ID -> LS nibble
007D F4                 151         CPL  A              ;Complement inverted input of BCD switch
007E 44F0               152         ORL  A,#0F0h        ;Set MS nibble so MS nibble of P2 = input mode
0080 F5A0               153         MOV  P2,A           ;Output target ID to P2
0082 120223             154         CALL PRESS_PLAY     ;Transmit target ID ("0" thru "9")
                        155    SEND_POSITION_DATA:
0085 1201D2             156         CALL DLY_1S         ;Pause after transmitting target ID
0088 7836               157         MOV  R0,#TBUF_START ;Init pointer to start of xmit buffer
008A 7C02               158         MOV  R4,#2          ;Transmit #degrees latitude
008C 1201DB             159         CALL PLAY_R4_TBUF_DIGITS
008F 7C02               160         MOV  R4,#2          ;Transmit whole minutes latitude
0091 1201DB             161         CALL PLAY_R4_TBUF_DIGITS
0094 75A0FF             162         MOV  P2,#0FFh       ;Transmit "POINT"
0097 120223             163         CALL PRESS_PLAY
009A 7C02               164         MOV  R4,#2          ;Transmit hundredths of minutes latitude
009C 1201DB             165         CALL PLAY_R4_TBUF_DIGITS
009F 1201EC             166         CALL PLAY_TBUF_DIR  ;Transmit (N)orth or (S)outh
00A2 1201D2             167         CALL DLY_1S         ;Pause after transmitting latitude
00A5 7C03               168         MOV  R4,#3          ;Transmit #degrees longitude
00A7 1201DB             169         CALL PLAY_R4_TBUF_DIGITS
00AA 7C02               170         MOV  R4,#2          ;Transmit whole minutes longiitude
00AC 1201DB             171         CALL PLAY_R4_TBUF_DIGITS
00AF 75A0FF             172         MOV  P2,#0FFh       ;Transmit "POINT"
00B2 120223             173         CALL PRESS_PLAY
00B5 7C02               174         MOV  R4,#2          ;Transmit hundredths of minutes longitude
00B7 1201DB             175         CALL PLAY_R4_TBUF_DIGITS
00BA 1201EC             176         CALL PLAY_TBUF_DIR  ;Transmit (E)ast or (W)est
00BD 1201C9             177         CALL DLY_P5S        ;Pause after transmitting longitude
00C0 C293               178         CLR  EN_XMTR        ;Turn off transmitter
00C2 D295               179         SETB PULSE_OFF      ;Reset XMTR/DVM? power relay off
00C4 1201C0             180         CALL DLY_P1S
00C7 C295               181         CLR  PULSE_OFF
                        182    INTER_TRANSMISSION_DELAY:
00C9 E583               183         MOV  A,DPH          ;Wait for 60 seconds
00CB B404FB             184         CJNE A,#IXD_HI,INTER_TRANSMISSION_DELAY
00CE E582               185         MOV  A,DPL
00D0 B480F6             186         CJNE A,#IXD_LO,INTER_TRANSMISSION_DELAY
00D3 900000             187         MOV  DPTR,#0000h    ;Reset counter for next 60 seconds
```

```
0006 8088             188          JMP   MAIN_LOOP       ;Loop to transmit next WGS-84 coordinates
                      189
                      190 ;IIIIIIIIIIIIIIIIIIIIIIIIIIIIIIIIIIIIIIIIIIIIIIIIIIIIIIIIIIIIIIIIIIIIIIIIIII
                      191
                      192 ;                              INTERRUPT SERVICE ROUTINES
                      193
                      194 ;IIIIIIIIIIIIIIIIIIIIIIIIIIIIIIIIIIIIIIIIIIIIIIIIIIIIIIIIIIIIIIIIIIIIIIIIIII
                      195 ;IIIIIIIIIIIIIIIIIIIIIIIIIIIIIIIIIIIIIIIIIIIIIIIIIIIIIIIIIIIIIIIIIIIIIIIIIII
                      196
                      197 ;                              TIMER0_ISR
                      198 ;IIIIIIIIIIIIIIIIIIIIIIIIIIIIIIIIIIIIIIIIIIIIIIIIIIIIIIIIIIIIIIIIIIIIIIIIIII
                      199 TIMER0_ISR:
00D8 C28C             200          CLR   TR0             ;Stop TIMER0
00DA 758C4C           201          MOV   TH0,#P05_SEC_HI ;Renitialize TIMER0 counter registers
00DD 758A00           202          MOV   TL0,#P05_SEC_LO
00E0 D28C             203          SETB  TR0             ;Enable TIMER0
00E2 A3               204          INC   DPTR            ;Increment 60 second timer counter
00E3 0525             205          INC   TICK            ;Increment relative timer counter
00E5 32               206          RETI                  ;And return
                      207
                      208 ;IIIIIIIIIIIIIIIIIIIIIIIIIIIIIIIIIIIIIIIIIIIIIIIIIIIIIIIIIIIIIIIIIIIIIIIIIII
                      209
                      210 ;                              SERIAL_PORT_ISR
                      211 ;IIIIIIIIIIIIIIIIIIIIIIIIIIIIIIIIIIIIIIIIIIIIIIIIIIIIIIIIIIIIIIIIIIIIIIIIIII
                      212 SERIAL_PORT_ISR:
00E6 C0D0             213          PUSH  PSW             ;Save register bank 0 (used by all other code)
00E8 75D008           214          MOV   PSW,#08h        ;Clear flags and select register bank 1
00EB E599             215          MOV   A,SBUF          ;Read serial port receive register
00ED F522             216          MOV   RCHAR,A         ;Save received character
00EF C298             217          CLR   RI              ;Reset serial port interrupt flag
00F1 209A05           218          JB    RB8,STOP_BIT_OK ;Jump if stop bit (bit #10) = 1
00F4 D201             219          SETB  STOP_BIT_ERROR  ;Else indicate data may be erroneous
00F6 D0D0             220          POP   PSW
00F8 32               221          RETI                  ;And return
                      222 STOP_BIT_OK:
00F9 B42412           223          CJNE  A,#'$',LOOK_UP_RESPONSE ;Jump if not starting new sentence
00FC 752627           224          MOV   RBUF_PTR,#RBUF_START ;Else reset pointers, counters, & flags
00FF 752400           225          MOV   RCHAR_CTR,#0
0102 752300           226          MOV   CHECKSUM,#0
0105 C202             227          CLR   NOT_VALID
0107 C201             228          CLR   STOP_BIT_ERROR
0109 C200             229          CLR   UPDATE
010B D0D0             230          POP   PSW
010D 32               231          RETI                  ;And return
                      232 LOOK_UP_RESPONSE:
010E 0524             233          INC   RCHAR_CTR       ;Increment index of received characters
0110 E524             234          MOV   A,RCHAR_CTR     ;Make sure no more than 50 characters received
0112 C3               235          CLR   C
0113 9433             236          SUBB  A,#51
0115 4003             237          JC    RCHAR_CTR_OK    ;Jump if less than 51 characters received
0117 D0D0             238          POP   PSW
0119 32               239          RETI                  ;Else return
                      240 RCHAR_CTR_OK:
011A E524             241          MOV   A,RCHAR_CTR     ;Look up response code indexed by RCHAR_CTR
011C 2402             242          ADD   A,#2            ;Offset PC value by 3 (RCHAR_CTR was already
011E 83               243          MOVC  A,@A+PC         ;incremented above) to begin table after LJMP
011F 020154           244          LJMP  RESPOND         ;Long Jump (3 bytes) after getting response code
                      245 RESPONSE_TABLE:
0122 00               246          DB    0               ; 1, G
0123 01               247          DB    1               ; 2, P
0124 01               248          DB    1               ; 3, R
0125 01               249          DB    1               ; 4, M
0126 01               250          DB    1               ; 5, C
0127 01               251          DB    1               ; 6, ,
0128 01               252          DB    1               ; 7, ,
0129 02               253          DB    2               ; 8, A or V (Valid or Invalid)
012A 01               254          DB    1               ; 9, ,
```

```
012B 03      255         DB  3       ;10, RBUF_LAT_100
012C 03      256         DB  3       ;11, RBUF_LAT_D
012D 03      257         DB  3       ;12, RBUF_LAT_10M
012E 03      258         DB  3       ;13, RBUF_LAT_M
012F 01      259         DB  1       ;14, .
0130 03      260         DB  3       ;15, RBUF_LAT_P1M
0131 03      261         DB  3       ;16, RBUF_LAT_P01M
0132 01      262         DB  1       ;17, ,
0133 03      263         DB  3       ;18, RBUF_LAT_DIR
0134 01      264         DB  1       ;19, ,
0135 03      265         DB  3       ;20, RBUF_LONG_100D
0136 03      266         DB  3       ;21, RBUF_LONG_10D
0137 03      267         DB  3       ;22, RBUF_LONG_D
0138 03      268         DB  3       ;23, RBUF_LONG_10M
0139 03      269         DB  3       ;24, RBUF_LONG_M
013A 01      270         DB  1       ;25, .
013B 03      271         DB  3       ;26, RBUF_LONG_P1M
013C 03      272         DB  3       ;27, RBUF_LONG_P01M
013D 01      273         DB  1       ;28, ,
013E 03      274         DB  3       ;29, RBUF_LONG_DIR
013F 01      275         DB  1       ;30, ,
0140 01      276         DB  1       ;31, Speed (knots) tens
0141 01      277         DB  1       ;32,   "      "   units
0142 01      278         DB  1       ;33, .
0143 01      279         DB  1       ;34,   "      "   tenths
0144 01      280         DB  1       ;35, ,
0145 01      281         DB  1       ;36, COG (track) degrees true hundreds
0146 01      282         DB  1       ;37,   "     "      "      "   tens
0147 01      283         DB  1       ;38,   "     "      "      "   units
0148 01      284         DB  1       ;39, .
0149 01      285         DB  1       ;40,   "     "      "      "   tenths
014A 01      286         DB  1       ;41, , DaMoYr Field (empty on NAV 5000)
014B 01      287         DB  1       ;42, ,
014C 01      288         DB  1       ;43, Variation (degrees) tens
014D 01      289         DB  1       ;44,    "         "     units
014E 01      290         DB  1       ;45, .
014F 01      291         DB  1       ;46, ,
0150 01      292         DB  1       ;47, Variation sense (E)ast or (W)est
0151 04      293         DB  4       ;48, *
0152 05      294         DB  5       ;49, CHECKSUM tens
0153 06      295         DB  6       ;50,    "     units
             296  RESPOND:
0154 B40006  297         CJNE A,#0,RESPOND_TO_1 ;Jump if response code <> 0
0157 852223  298         MOV  CHECKSUM,RCHAR   ;Else character is first in CHECKSUM
015A D0D0    299         POP  PSW
015C 32      300         RETI
             301  RESPOND_TO_1:
015D B40109  302         CJNE A,#1,RESPOND_TO_2 ;Jump if response code <> 1
0160 E523    303         MOV  A,CHECKSUM       ;Else character is XOR'd with CHECKSUM
0162 6522    304         XRL  A,RCHAR
0164 F523    305         MOV  CHECKSUM,A
0166 D0D0    306         POP  PSW
0168 32      307         RETI
             308  RESPOND_TO_2:
0169 B40213  309         CJNE A,#2,RESPOND_TO_3 ;Jump if response code <> 2
016C E523    310         MOV  A,CHECKSUM       ;Else character is XOR'd with CHECKSUM
016E 6522    311         XRL  A,RCHAR
0170 F523    312         MOV  CHECKSUM,A
0172 E522    313         MOV  A,RCHAR
0174 B44103  314         CJNE A,#'A',VALIDITY_ERROR ;Jump if data isn't valid
0177 D0D0    315         POP  PSW
0179 32      316         RETI
             317  VALIDITY_ERROR:
017A D202    318         SETB NOT_VALID        ;Flag validity error
017C D0D0    319         POP  PSW
017E 32      320         RETI
             321  RESPOND_TO_3:
```

```
017F B4030F      322                CJNE  A,#3,RESPOND_TO_4   ;Jump if response code <> 3
0182 E523        323                MOV   A,CHECKSUM          ;Else character is XOR'd with CHECKSUM
0184 6522        324                XRL   A,RCHAR
0186 F523        325                MOV   CHECKSUM,A
0188 A826        326                MOV   R0,RBUF_PTR         ;And copy RCHAR into RBUF
018A A622        327                MOV   @R0,RCHAR
018C 0526        328                INC   RBUF_PTR            ;Then point to next RBUF location
018E D0D0        329                POP   PSW
0190 32          330                RETI
                 331     RESPOND_TO_4:
0191 B40403      332                CJNE  A,#4,RESPOND_TO_5   ;Jump if response code <> 4
0194 D0D0        333                POP   PSW
0196 32          334                RETI                      ;Else ignore '*' character
                 335     RESPOND_TO_5:
0197 B40508      336                CJNE  A,#5,RESPOND_TO_6   ;Jump if response code <> 5
019A 120212      337                CALL  ASCII_TO_REAL       ;Else convert ASCII checksum tens
019D C4          338                SWAP  A                   ;MSN -> left
019E F9          339                MOV   R1,A                ;Save for next serial port interrupt
019F D0D0        340                POP   PSW
01A1 32          341                RETI
                 342     RESPOND_TO_6:
01A2 120212      343                CALL  ASCII_TO_REAL       ;Convert ASCII checksum units
01A5 49          344                ORL   A,R1                ;Mask LSN into checksum
01A6 B52314      345                CJNE  A,CHECKSUM,DO_NOT_TRANSFER ;Jump if rcvd and calc checksum not =
01A9 200211      346                JB    NOT_VALID,DO_NOT_TRANSFER
01AC 20010E      347                JB    STOP_BIT_ERROR,DO_NOT_TRANSFER
                 348     TRANSFER:
01AF 7827        349                MOV   R0,#RBUF_START      ;Copy RBUF to TBUF
01B1 7936        350                MOV   R1,#TBUF_START
01B3 7A0E        351                MOV   R2,#BUF_LENGTH
                 352     TRANSFER_LOOP:
01B5 E6          353                MOV   A,@R0
01B6 F7          354                MOV   @R1,A
01B7 08          355                INC   R0
01B8 09          356                INC   R1
01B9 DAFA        357                DJNZ  R2,TRANSFER_LOOP
01BB D200        358                SETB  UPDATE              ;Indicate that a valid GPS position was rcvd
                 359     DO_NOT_TRANSFER:
01BD D0D0        360                POP   PSW                 ;Restore PSW
01BF 32          361                RETI
                 362
                 363     ;SSSSSSSSSSSSSSSSSSSSSSSSSSSSSSSSSSSSSSSSSSSSSSSSSSSSSSSSSSSSSSSSSSS
                 364
                 365     ;                           SUBROUTINES
                 366
                 367     ;SSSSSSSSSSSSSSSSSSSSSSSSSSSSSSSSSSSSSSSSSSSSSSSSSSSSSSSSSSSSSSSSSSS
                 368     ;SSSSSSSSSSSSSSSSSSSSSSSSSSSSSSSSSSSSSSSSSSSSSSSSSSSSSSSSSSSSSSSSSSS
                 369
                 370     ;                           DLY_P1S
                 371     ;SSSSSSSSSSSSSSSSSSSSSSSSSSSSSSSSSSSSSSSSSSSSSSSSSSSSSSSSSSSSSSSSSSS
                 372     DLY_P1S:
01C0 752500      373                MOV   TICK,#0             ;Clear relative timer
                 374     P1S_LOOP:
01C3 AA25        375                MOV   R2,TICK
01C5 BA02FB      376                CJNE  R2,#2,P1S_LOOP
01C8 22          377                RET
                 378
                 379     ;SSSSSSSSSSSSSSSSSSSSSSSSSSSSSSSSSSSSSSSSSSSSSSSSSSSSSSSSSSSSSSSSSSS
                 380     ;SSSSSSSSSSSSSSSSSSSSSSSSSSSSSSSSSSSSSSSSSSSSSSSSSSSSSSSSSSSSSSSSSSS
                 381
                 382     ;                           DLY_P5S
                 383     ;SSSSSSSSSSSSSSSSSSSSSSSSSSSSSSSSSSSSSSSSSSSSSSSSSSSSSSSSSSSSSSSSSSS
                 384     DLY_P5S:
01C9 752500      385                MOV   TICK,#0             ;Clear relative timer
                 386     P5S_LOOP:
01CC AA25        387                MOV   R2,TICK
01CE BA0AFB      388                CJNE  R2,#10,P5S_LOOP
```

```
01D1 22              389              RET
                     390
                     391      ;SSSSSSSSSSSSSSSSSSSSSSSSSSSSSSSSSSSSSSSSSSSSSSSSSSSSSSSSSSSSSSSSSSS
                     392      ;SSSSSSSSSSSSSSSSSSSSSSSSSSSSSSSSSSSSSSSSSSSSSSSSSSSSSSSSSSSSSSSSSSS
                     393
                     394      ;                         DLY_1S
                     395      ;SSSSSSSSSSSSSSSSSSSSSSSSSSSSSSSSSSSSSSSSSSSSSSSSSSSSSSSSSSSSSSSSSSS
                     396      DLY_1S:
01D2 752500          397              MOV  TICK,#0       ;Clear relative timer
                     398      OS_LOOP:
01D5 AA25            399              MOV  R2,TICK
01D7 BA14FB          400              CJNE R2,#20,OS_LOOP
01DA 22              401              RET
                     402
                     403      ;SSSSSSSSSSSSSSSSSSSSSSSSSSSSSSSSSSSSSSSSSSSSSSSSSSSSSSSSSSSSSSSSSSS
                     404      ;SSSSSSSSSSSSSSSSSSSSSSSSSSSSSSSSSSSSSSSSSSSSSSSSSSSSSSSSSSSSSSSSSSS
                     405
                     406      ;                    PLAY_R4_TBUF_DIGITS
                     407      ;SSSSSSSSSSSSSSSSSSSSSSSSSSSSSSSSSSSSSSSSSSSSSSSSSSSSSSSSSSSSSSSSSSS
                     408      PLAY_R4_TBUF_DIGITS:
01DB E6              409              MOV  A,@R0
01DC C3              410              CLR  C
01DD 9430            411              SUBB A,#30h
01DF 44F0            412              ORL  A,#0F0h
01E1 F5A0            413              MOV  P2,A
01E3 120223          414              CALL PRESS_PLAY
01E6 08              415              INC  R0
01E7 DCF2            416              DJNZ R4,PLAY_R4_TBUF_DIGITS
01E9 31C9            417              CALL DLY_P5S
01EB 22              418              RET
                     419
                     420      ;SSSSSSSSSSSSSSSSSSSSSSSSSSSSSSSSSSSSSSSSSSSSSSSSSSSSSSSSSSSSSSSSSSS
                     421
                     422      ;                       PLAY_TBUF_DIR
                     423      ;SSSSSSSSSSSSSSSSSSSSSSSSSSSSSSSSSSSSSSSSSSSSSSSSSSSSSSSSSSSSSSSSSSS
                     424      PLAY_TBUF_DIR:
01EC E6              425              MOV  A,@R0
01ED B44E06          426      NORTH?:  CJNE A,#'N',SOUTH?
01F0 75A0FA          427              MOV  P2,#0FAh
01F3 02020B          428              JMP  SEND_DIR
01F6 B45306          429      SOUTH?:  CJNE A,#'S',EAST?
01F9 75A0FB          430              MOV  P2,#0FBh
01FC 02020B          431              JMP  SEND_DIR
01FF B44506          432      EAST?:   CJNE A,#'E',WEST
0202 75A0FC          433              MOV  P2,#0FCh
0205 02020B          434              JMP  SEND_DIR
0208 75A0FD          435      WEST:   MOV  P2,#0FDh
                     436      SEND_DIR:
020B 120223          437              CALL PRESS_PLAY
020E 08              438              INC  R0
020F 31D2            439              CALL DLY_1S
0211 22              440              RET
                     441
                     442      ;SSSSSSSSSSSSSSSSSSSSSSSSSSSSSSSSSSSSSSSSSSSSSSSSSSSSSSSSSSSSSSSSSSS
                     443      ;SSSSSSSSSSSSSSSSSSSSSSSSSSSSSSSSSSSSSSSSSSSSSSSSSSSSSSSSSSSSSSSSSSS
                     444
                     445      ;                       ASCII_TO_REAL
                     446      ;SSSSSSSSSSSSSSSSSSSSSSSSSSSSSSSSSSSSSSSSSSSSSSSSSSSSSSSSSSSSSSSSSSS
                     447      ASCII_TO_REAL:
0212 E522            448              MOV  A,RCHAR
0214 C3              449              CLR  C
0215 9440            450              SUBB A,#40h
0217 E522            451              MOV  A,RCHAR
0219 5004            452              JNC  CHAR_IS_ALPHA
                     453      CHAR_ISWNUMERIC:
021B C3              454              CLR  C
021C 9430            455              SUBB A,#30h
```

```
021E 22          456              RET
                 457      CHAR_IS_ALPHA:
021F C3          458              CLR   C
0220 9437        459              SUBB  A,#37h
0222 22          460              RET
                 461
                 462      ;SSSSSSSSSSSSSSSSSSSSSSSSSSSSSSSSSSSSSSSSSSSSSSSSSSSSSSSSSSSSSSSSSSSSS
                 463      ;SSSSSSSSSSSSSSSSSSSSSSSSSSSSSSSSSSSSSSSSSSSSSSSSSSSSSSSSSSSSSSSSSSSSS
                 464
                 465      ;                        PRESS_PLAY
                 466      ;SSSSSSSSSSSSSSSSSSSSSSSSSSSSSSSSSSSSSSSSSSSSSSSSSSSSSSSSSSSSSSSSSSSSS
                 467      PRESS_PLAY:
0223 3090FD      468              JNB   nBUSY,$      ;Loop until DVM is not busy
0226 C291        469              CLR   nPLAY        ;Assert active-low PLAY discrete
0228 31C0        470              CALL  DLY_P1S      ;Hold for 0.1 seconds
022A D291        471              SETB  nPLAY        ;Deassert active-low PLAY discrete
022C 3090FD      472              JNB   nBUSY,$      ;Loop until DVM is not busy
022F 22          473              RET
                 474
                 475      ;SSSSSSSSSSSSSSSSSSSSSSSSSSSSSSSSSSSSSSSSSSSSSSSSSSSSSSSSSSSSSSSSSSSSS
                 476      ;BBBBBBBBBBBBBBBBBBBBBBBBBBBBBBBBBBBBBBBBBBBBBBBBBBBBBBBBBBBBBBBBBBBBB
                 477
----             478              BSEG               ;Beginning of Bit Segment
0000             479              ORG   00h
0000             480      UPDATE:           DBIT  1  ;Set by SERIAL_PORT_ISR on good sentence
0001             481      STOP_BIT_ERROR:   DBIT  1  ;  "    "    "    "    "  " 0 stop bit
0002             482      NOT_VALID:        DBIT  1  ;  "    "    "    "    "  " invalid sentence
                 483
                 484      ;BBBBBBBBBBBBBBBBBBBBBBBBBBBBBBBBBBBBBBBBBBBBBBBBBBBBBBBBBBBBBBBBBBBBB
                 485      ;DDDDDDDDDDDDDDDDDDDDDDDDDDDDDDDDDDDDDDDDDDDDDDDDDDDDDDDDDDDDDDDDDDDDD
                 486
----             487              DSEG               ;Beginning of Data Segment
0022             488              ORG   22h
0022             489      RCHAR:            DS    1  ;Character received from SBUF
0023             490      CHECKSUM:         DS    1  ;All characters but "$","*", and CS -> checksum
0024             491      RCHAR_CTR:        DS    1  ;No. of characters received after "$"
0025             492      TICK:             DS    1  ;Relative counter variable for 0.05 sec. int.
0026             493      RBUF_PTR:         DS    1  ;SERIAL_PORT_ISR uses this ptr to fill RBUF
                 494
                 495      RBUF_START:
0027             496      RBUF_LAT_10D:     DS    1  ;Receiver buffer latitude tens of degrees
0028             497      RBUF_LAT_D:       DS    1  ;    "       "       "    degrees
0029             498      RBUF_LAT_10M:     DS    1  ;    "       "       "    tens of minutes
002A             499      RBUF_LAT_M:       DS    1  ;    "       "       "    minutes
002B             500      RBUF_LAT_P1M:     DS    1  ;    "       "       "    tenths of minutes
002C             501      RBUF_LAT_P01M:    DS    1  ;    "       "       "    hundredths of minutes
002D             502      RBUF_LAT_DIR:     DS    1  ;    "       "       "    (N)orth or (S)outh
                 503
002E             504      RBUF_LONG_100D:   DS    1  ;    "       "    longitude hundreds of degrees
002F             505      RBUF_LONG_10D:    DS    1  ;    "       "       "    tens of degrees
0030             506      RBUF_LONG_D:      DS    1  ;    "       "       "    degrees
0031             507      RBUF_LONG_10M:    DS    1  ;    "       "       "    tens of minutes
0032             508      RBUF_LONG_M:      DS    1  ;    "       "       "    minutes
0033             509      RBUF_LONG_P1M:    DS    1  ;    "       "       "    tenths of minutes
0034             510      RBUF_LONG_P01M:   DS    1  ;    "       "       "    hundredths of minutes
0035             511      RBUF_LONG_DIR:    DS    1  ;    "       "       "    (E)ast or (W)est
                 512
                 513      TBUF_START:
0036             514      TBUF_LAT_10D:     DS    1  ;Transmit buffer latitude tens of degrees
0037             515      TBUF_LAT_D:       DS    1  ;    "       "       "    degrees
0038             516      TBUF_LAT_10M:     DS    1  ;    "       "       "    tens of minutes
0039             517      TBUF_LAT_M:       DS    1  ;    "       "       "    minutes
003A             518      TBUF_LAT_P1M:     DS    1  ;    "       "       "    tenths of minutes
003B             519      TBUF_LAT_P01M:    DS    1  ;    "       "       "    hundredths of minutes
003C             520      TBUF_LAT_DIR:     DS    1  ;    "       "       "    (N)orth or (S)outh
                 521
003D             522      TBUF_LONG_100D:   DS    1  ;    "       "    longitude hundreds of degrees
```

```
003E            523     TBUF_LONG_10D: DS    1       ;   "    "    "    tens of degrees
003F            524     TBUF_LONG_D:   DS    1       ;   "    "    "    degrees
0040            525     TBUF_LONG_10M: DS    1       ;   "    "    "    tens of minutes
0041            526     TBUF_LONG_M:   DS    1       ;   "    "    "    minutes
0042            527     TBUF_LONG_P1M: DS    1       ;   "    "    "    tenths of minutes
0043            528     TBUF_LONG_P01M: DS   1       ;   "    "    "    hundredths of minutes
0044            529     TBUF_LONG_DIR: DS    1       ;   "    "    "    (E)ast or (W)est
                530
                531     ;DDDDDDDDDDDDDDDDDDDDDDDDDDDDDDDDDDDDDDDDDDDDDDDDDDDDDDDDDDDDDDDDDDDDDDDD
                532
                533             END                  ;End of MAGIC3.ASM
```

SYMBOL TABLE LISTING
------ ----- -------

```
N A M E                         T Y P E    V A L U E     A T T R I B U T E S

ASCII_TO_REAL. . . . . .        C ADDR     0212H    A
BAUD_4800. . . . . . . .          NUMB     00FAH    A
BEGIN. . . . . . . . . .        C ADDR     0000H    A
BUF_LENGTH . . . . . . .          NUMB     000EH    A
CHAR_IS_ALPHA. . . . . .        C ADDR     021FH    A
CHAR_IS_NUMERIC. . . . .        C ADDR     021BH    A
CHECKSUM . . . . . . . .        D ADDR     0023H    A
CLEAR_BUF_LOOP . . . . .        C ADDR     003DH    A
CONTINUE . . . . . . . .        C ADDR     0037H    A
DLY_1S . . . . . . . . .        C ADDR     01D2H    A
DLY_P1S. . . . . . . . .        C ADDR     01C0H    A
DLY_P5S. . . . . . . . .        C ADDR     01C9H    A
DO_NOT_TRANSFER. . . . .        C ADDR     01BDH    A
DPH. . . . . . . . . . .        D ADDR     0083H    A
DPL. . . . . . . . . . .        D ADDR     0082H    A
EAST?. . . . . . . . . .        C ADDR     01FFH    A
EN_XMTR. . . . . . . . .        B ADDR     0090H.3  A
GO . . . . . . . . . . .        B ADDR     0090H.2  A
IE . . . . . . . . . . .        D ADDR     00A8H    A
INIT . . . . . . . . . .        C ADDR     0026H    A
INITIALIZE_REGISTERS . .        C ADDR     0045H    A
INTER_TRANSMISSION_DELAY        C ADDR     00C9H    A
IP . . . . . . . . . . .        D ADDR     00B8H    A
IXD_HI . . . . . . . . .          NUMB     0004H    A
IXD_LO . . . . . . . . .          NUMB     0080H    A
LOOK_UP_RESPONSE . . . .        C ADDR     010EH    A
MAIN_LOOP. . . . . . . .        C ADDR     0060H    A
NBUSY. . . . . . . . . .        B ADDR     0090H.0  A
NORTH? . . . . . . . . .        C ADDR     01EDH    A
NOT_VALID. . . . . . . .        B ADDR     0020H.2  A
NPLAY. . . . . . . . . .        B ADDR     0090H.1  A
OS_LOOP. . . . . . . . .        C ADDR     01D5H    A
P05_SEC_HI . . . . . . .          NUMB     004CH    A
P05_SEC_LO . . . . . . .          NUMB     0000H    A
P1 . . . . . . . . . . .        D ADDR     0090H    A
P1S_LOOP . . . . . . . .        C ADDR     01C3H    A
P2 . . . . . . . . . . .        D ADDR     00A0H    A
P5S_LOOP . & . . . . . .        C ADDR     01CCH    A
PLAY_R4_TBUF_DIGITS. . .        C ADDR     01DBH    A
PLAY_TBUF_DIR. . . . . .        C ADDR     01ECH    A
PRESS_PLAY . . . . . . .        C ADDR     0223H    A
PSW. . . . . . . . . . .        D ADDR     00D0H    A
PULSE_OFF. . . . . . . .        B ADDR     0090H.5  A
PULSE_ON . . . . . . . .        B ADDR     0090H.4  A
RB8. . . . . . . . . . .        B ADDR     0098H.2  A
RBUF_LAT_10D . . . . . .        D ADDR     0027H    A
```

| | | | | |
|---|---|---|---|---|
| RBUF_LAT_10M . . . . . . . | D ADDR | 0029H | A |
| RBUF_LAT_D . . . . . . . . | D ADDR | 0028H | A |
| RBUF_LAT_DIR . . . . . . | D ADDR | 002DH | A |
| RBUF_LAT_M . . . . . . . | D ADDR | 002AH | A |
| RBUF_LAT_P01M. . . . . . | D ADDR | 002CH | A |
| RBUF_LAT_P1M . . . . . . | D ADDR | 002BH | A |
| RBUF_LONG_100D . . . . . | D ADDR | 002EH | A |
| RBUF_LONG_10D. . . . . . | D ADDR | 002FH | A |
| RBUF_LONG_10M. . . . . . | D ADDR | 0031H | A |
| RBUF_LONG_D. . . . . . . | D ADDR | 0030H | A |
| RBUF_LONG_DIR. . . . . . | D ADDR | 0035H | A |
| RBUF_LONG_M. . . . . . . | D ADDR | 0032H | A |
| RBUF_LONG_P01M . . . . . | D ADDR | 0034H | A |
| RBUF_LONG_P1M. . . . . . | D ADDR | 0033H | A |
| RBUF_PTR . . . . . . . . | D ADDR | 0026H | A |
| RBUF_START . . . . . . . | D ADDR | 0027H | A |
| RCHAR_CTR_OK . . . . . . | C ADDR | 011AH | A |
| RCHAR_CTR. . . . . . . . | D ADDR | 0024H | A |
| RCHAR. . . . . . . . . . | D ADDR | 0022H | A |
| RESPOND_TO_1 . . . . . . | C ADDR | 015DH | A |
| RESPOND_TO_2 . . . . . . | C ADDR | 0169H | A |
| RESPOND_TO_3 . . . . . . | C ADDR | 017FH | A |
| RESPOND_TO_4 . . . . . . | C ADDR | 0191H | A |
| RESPOND_TO_5 . . . . . . | C ADDR | 0197H | A |
| RESPOND_TO_6 . . . . . . | C ADDR | 01A2H | A |
| RESPOND. . . . . . . . . | C ADDR | 0154H | A |
| RESPONSE_TABLE . . . . . | C ADDR | 0122H | A |
| RI . . . . . . . . . . . | B ADDR | 0098H.0 | A |
| SBUF . . . . . . . . . . | D ADDR | 0099H | A |
| SCON . . . . . . . . . . | D ADDR | 0098H | A |
| SEND_DIR . . . . . . . . | C ADDR | 020BH | A |
| SEND_POSITION_DATA . . . | C ADDR | 0085H | A |
| SEND_TARGET_ID . . . . . | C ADDR | 0078H | A |
| SERIAL_PORT_ISR. . . . . | C ADDR | 00E6H | A |
| SOUTH? . . . . . . . . . | C ADDR | 01F6H | A |
| SP . . . . . . . . . . . | D ADDR | 0081H | A |
| STOP_BIT_ERROR . . . . . | B ADDR | 0020H.1 | A |
| STOP_BIT_OK. . . . . . . | C ADDR | 00F9H | A |
| STOP?. . . . . . . . . . | C ADDR | 0032H | A |
| TBUF_LAT_10D . . . . . . | D ADDR | 0036H | A |
| TBUF_LAT_10M . . . . . . | D ADDR | 0038H | A |
| TBUF_LAT_D . . . . . . . | D ADDR | 0037H | A |
| TBUF_LAT_DIR . . . . . . | D ADDR | 003CH | A |
| TBUF_LAT_M . . . . . . . | D ADDR | 0039H | A |
| TBUF_LAT_P01M. . . . . . | D ADDR | 003BH | A |
| TBUF_LAT_P1M . . . . . . | D ADDR | 003AH | A |
| TBUF_LONG_100D . . . . . | D ADDR | 003DH | A |
| TBUF_LONG_10D. . . . . . | D ADDR | 003EH | A |
| TBUF_LONG_10M. . . . . . | D ADDR | 0040H | A |
| TBUF_LONG_D. . . . . . . | D ADDR | 003FH | A |
| TBUF_LONG_DIR. . . . . . | D ADDR | 0044H | A |
| TBUF_LONG_M. . . . . . . | D ADDR | 0041H | A |
| TBUF_LONG_P01M . . . . . | D ADDR | 0043H | A |
| TBUF_LONG_P1M. . . . . . | D ADDR | 0042H | A |
| TBUF_START . . . . . . . | D ADDR | 0036H | A |
| TCON . . . . . . . . . . | D ADDR | 0088H | A |
| TH0. . . . . . . . . . . | D ADDR | 008CH | A |
| TH1. . . . . . . . . . . | D ADDR | 008DH | A |
| TICK . . . . . . . . . . | D ADDR | 0025H | A |
| TIMER0_ISR . . . . . . . | C ADDR | 00D8H | A |
| TL0. . . . . . . . . . . | D ADDR | 008AH | A |
| TL1. . . . . . . . . . . | D ADDR | 008BH | A |
| TMOD . . . . . . . . . . | D ADDR | 0089H | A |
| TR0. . . . . . . . . . . | B ADDR | 0088H.4 | A |
| TRANSFER_LOOP. . . . . . | C ADDR | 01B5H | A |
| TRANSFER . . . . . . . . | C ADDR | 01AFH | A |
| UPDATE . . . . . . . . . | B ADDR | 0020H.0 | A |

```
VALIDITY_ERROR . . . . .   C ADDR    017AH    A
WEST . . . . . . . . . .   C ADDR    0208H    A

REGISTER BANK(S) USED: 0

ASSEMBLY COMPLETE, NO ERRORS FOUND
```

What is claimed is:

1. An audio information system for determining a present location, said audio information system comprising:

a global position system receiver for providing electrical signals representative of a plurality of ASCII data characters, said plurality of ASCII data characters including latitude and longitude spherical coordinates indicative of the present location of said global position system receiver and a first checksum;

an optical coupler coupled to said global position system receiver for receiving said electrical signals and converting said electrical signals to a serial digital format;

a microprocessor coupled to said optical coupler for receiving said electrical signals converted to said serial digital format by said optical coupler, converting a predetermined number of said electrical signals received thereby to a plurality of binary addresses representative of said latitude and longitude spherical coordinates, calculating a second checksum and generating a play signal;

said microprocessor comparing said first checksum with said second checksum, said microprocessor setting a do not transfer flag whenever said first checksum is not equal to said second checksum;

a NAND gate having a first input for receiving a logic one, a second input coupled to said microprocessor for receiving said play signal and an output;

said NAND gate inverting said play signal to provide an inverted play signal;

a digital voice module coupled to said microprocessor and the output of said NAND gate for receiving said inverted play signal, said digital voice module receiving said plurality of binary addresses from said microprocessor whenever said microprocessor does not set said do not transfer flag, said digital voice module, responsive to said plurality of binary addresses and said inverted play signal, generating an analog audio voice signal representing said latitude and longitude spherical coordinates;

a two position switch having an input connected to said digital voice module, a first output and a second output;

a transmitter coupled to the first output of said switch for receiving said analog audio voice signal through said switch from said digital voice module, said transmitter having an antenna, said transmitter responsive to said analog audio voice signal providing a plurality of position messages at a predetermined frequency, said position messages including said latitude and longitude spherical coordinates;

said antenna transmitting said plurality of position messages at said predetermined frequency to provide an indication of the present location of said global position system receiver; and a speaker connected to the second output of said switch for receiving said analog audio voice signal through said switch from said digital voice module, said speaker means, responsive to said analog audio voice signal broadcasting position information, said position information including said latitude and longitude spherical coordinates indicative of the present location of said global position system receiver.

2. The audio information system of claim 1 wherein each of said latitude and longitude spherical coordinates transmitted by said antenna has a direction, said direction being north or south for each of said latitude spherical coordinates and east or west for each of said longitude spherical coordinates.

3. The audio information system of claim 1 wherein each of said latitude and longitude spherical coordinates broadcast by said speaker has a direction, said direction being north or south for each of said latitude spherical coordinates and east or west for each of said longitude spherical coordinates.

4. The audio information system of claim 1 wherein said plurality of ASCII data characters comprises fifty ASCII data characters.

5. The audio information system of claim 1 further comprising a microphone connected to said digital voice module.

6. The audio information system of claim 1 further comprising:

a source of direct current voltage;

a first resistor having a first terminal connected to said source of direct current voltage and a second terminal;

a normally open switch having a first terminal connected to the second terminal of said first resistor and a second terminal connected to ground;

a first Schmitt Trigger inverter having an input connected to the second terminal of said first resistor and the first terminal of said normally open switch and an output;

a two position index direction switch having an input connected to said source of direct current voltage and an output;

a four bit up/down counter having a clock input connected to the output of said first Schmitt Trigger inverter, a down/up count input connected to the output of said two position index direction switch, a not load input for receiving an external reset signal, first, second, third and fourth data inputs connected to said source of direct current voltage and first, second, third and fourth data outputs;

a second Schmitt Trigger inverter having an input connected to the first data output of said four bit up/down counter and an output;

a third Schmitt Trigger inverter having an input connected to the second data output of said four bit up/down counter and an output;

a fourth Schmitt Trigger inverter having an input connected to the third data output of said four bit up/down counter and an output;

a fifth Schmitt Trigger inverter having an input connected to the fourth data output of said four bit up/down counter and an output;

a first field effect transistor having a gate connected to the output of said second Schmitt Trigger inverter, a source connected to ground and a drain;

a second field effect transistor having a gate connected to the output of said third Schmitt Trigger inverter, a source connected to ground and a drain;

a third field effect transistor having a gate connected to the output of said fourth Schmitt Trigger inverter, a source connected to ground and a drain;

a fourth field effect transistor having a gate connected to the output of said fifth Schmitt Trigger inverter, a source connected to ground and a drain;

a second resistor having a first terminal connected to said source of direct current voltage and a second terminal connected to the drain of said first field effect transistor;

a third resistor having a first terminal connected to said source of direct current voltage and a second terminal connected to the drain of said second field effect transistor;

a fourth resistor having a first terminal connected to said source of direct current voltage and a second terminal connected to the drain of said third field effect transistor;

a fifth resistor having a first terminal connected to said source of direct current voltage and a second terminal connected to the drain of said fourth field effect transistor; and a line driver having a first input connected to the drain of said first field effect transistor and the second terminal of said second resistor, a second input connected to the drain of said second field effect transistor and the second terminal of said third resistor, a third input connected to the drain of said third field effect transistor and the second terminal of said fourth resistor, a fourth input connected to the drain of said fourth field effect transistor and the second terminal of said fifth resistor and first, second, third and fourth outputs connected to said digital voice module.

7. The audio information system of claim 1 wherein each of said plurality of binary addresses comprises four binary address bits.

8. The audio information system of claim 1 further comprising a binary coded decimal switch coupled to said microprocessor.

* * * * *